US009651653B2

(12) United States Patent
Fischer et al.

(10) Patent No.: US 9,651,653 B2
(45) Date of Patent: May 16, 2017

(54) POSITIONING REFERENCE SIGNAL (PRS) GENERATION FOR MULTIPLE TRANSMIT ANTENNA SYSTEMS

(71) Applicant: QUALCOMM Incorporated, San Diego, CA (US)

(72) Inventors: Sven Fischer, Nuremberg (DE); Peter Gaal, San Diego, CA (US); Stephen William Edge, Escondido, CA (US); Arash Mirbagheri, San Diego, CA (US); Tingfang Ji, San Diego, CA (US); Guttorm R. Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 970 days.

(21) Appl. No.: 13/797,752

(22) Filed: Mar. 12, 2013

(65) Prior Publication Data

US 2014/0176366 A1      Jun. 26, 2014

Related U.S. Application Data

(60) Provisional application No. 61/745,742, filed on Dec. 24, 2012.

(51) Int. Cl.
| | |
|---|---|
| *H01Q 3/02* | (2006.01) |
| *G01S 5/02* | (2010.01) |
| *G01S 5/10* | (2006.01) |
| *H04W 64/00* | (2009.01) |

(52) U.S. Cl.
CPC .............. *G01S 5/0236* (2013.01); *G01S 5/10* (2013.01); *H04W 64/006* (2013.01)

(58) Field of Classification Search
CPC ........... G01S 1/08; H04W 4/00; H04W 24/00; H04W 4/02
USPC ........................................................ 342/386
See application file for complete search history.

(56) References Cited

U.S. PATENT DOCUMENTS

| | | | |
|---|---|---|---|
| 6,108,558 A | 8/2000 | Vanderspool, II | |
| 6,501,955 B1 | 12/2002 | Durrant et al. | |
| 6,564,064 B1 | 5/2003 | Ciganer et al. | |
| 7,016,688 B2 | 3/2006 | Simic et al. | |

(Continued)

FOREIGN PATENT DOCUMENTS

| | | |
|---|---|---|
| CN | 1867196 A | 11/2006 |
| CN | 1902838 A | 1/2007 |

(Continued)

OTHER PUBLICATIONS

International Search Report and Written Opinion—PCT/US2013/071764—ISA/EPO—May 15, 2014.

(Continued)

*Primary Examiner* — Harry Liu
(74) *Attorney, Agent, or Firm* — Silicon Valley Patent Group LLP

(57) ABSTRACT

A method of providing Observed Time Difference of Arrival (OTDOA) assistance information to a mobile station is disclosed. In some embodiments, the OTDOA assistance information may comprise Positioning Reference Signal (PRS) assistance information including antenna switching assistance information for at least one cell. In one embodiment, the method may be implemented on a location server for the cell.

69 Claims, 12 Drawing Sheets

(56) References Cited

U.S. PATENT DOCUMENTS

| | | | |
|---|---|---|---|
| 7,881,249 B2 | 2/2011 | Wheatley | |
| 8,493,267 B2 | 7/2013 | Wengler et al. | |
| 8,929,826 B2* | 1/2015 | Siomina | G01S 5/00 342/360 |
| 9,279,879 B2 | 3/2016 | Khandekar et al. | |
| 9,482,742 B1 | 11/2016 | Fischer | |
| 2003/0008663 A1 | 1/2003 | Stein et al. | |
| 2003/0008664 A1 | 1/2003 | Stein et al. | |
| 2003/0083008 A1 | 5/2003 | Baker et al. | |
| 2004/0176029 A1 | 9/2004 | Soliman | |
| 2004/0219930 A1 | 11/2004 | Lin | |
| 2004/0266338 A1 | 12/2004 | Rowitch | |
| 2005/0130672 A1 | 6/2005 | Dean et al. | |
| 2007/0014252 A1 | 1/2007 | Chung et al. | |
| 2008/0254743 A1 | 10/2008 | Nishikawa et al. | |
| 2009/0053993 A1 | 2/2009 | Baker et al. | |
| 2009/0061899 A1 | 3/2009 | Hwang et al. | |
| 2009/0143018 A1 | 6/2009 | Anderson et al. | |
| 2009/0203386 A1 | 8/2009 | Edge et al. | |
| 2010/0165882 A1 | 7/2010 | Palanki et al. | |
| 2010/0167743 A1 | 7/2010 | Palanki et al. | |
| 2010/0195566 A1 | 8/2010 | Krishnamurthy et al. | |
| 2010/0260154 A1* | 10/2010 | Frank | G01S 5/10 370/336 |
| 2010/0317351 A1 | 12/2010 | Gerstenberger et al. | |
| 2010/0323718 A1 | 12/2010 | Jen | |
| 2011/0105144 A1 | 5/2011 | Siomina et al. | |
| 2011/0117925 A1 | 5/2011 | Sampath et al. | |
| 2011/0117926 A1* | 5/2011 | Hwang | H04W 64/00 455/456.1 |
| 2011/0124347 A1* | 5/2011 | Chen | H04W 64/00 455/456.1 |
| 2011/0149903 A1 | 6/2011 | Krishnamurthy et al. | |
| 2011/0159901 A1 | 6/2011 | Frenger et al. | |
| 2011/0176440 A1 | 7/2011 | Frank et al. | |
| 2012/0027110 A1* | 2/2012 | Han | H04J 11/0079 375/260 |
| 2012/0040696 A1 | 2/2012 | Siomina et al. | |
| 2012/0046047 A1 | 2/2012 | Popovic et al. | |
| 2012/0083278 A1 | 4/2012 | Kazmi et al. | |
| 2012/0108270 A1 | 5/2012 | Kazmi et al. | |
| 2012/0189041 A1 | 7/2012 | Ko et al. | |
| 2012/0231809 A1* | 9/2012 | Siomina | H04W 64/00 455/456.1 |
| 2012/0252487 A1* | 10/2012 | Siomina | H04W 24/10 455/456.1 |
| 2013/0023285 A1* | 1/2013 | Markhovsky | G01S 3/74 455/456.1 |
| 2013/0194931 A1 | 8/2013 | Lee et al. | |
| 2014/0087754 A1* | 3/2014 | Siomina | H04W 4/02 455/456.1 |
| 2014/0286280 A1* | 9/2014 | Seo | H04B 7/0626 370/329 |
| 2015/0016239 A1 | 1/2015 | Yi et al. | |
| 2015/0195770 A1* | 7/2015 | Sun | H04J 1/08 370/330 |
| 2015/0282114 A1* | 10/2015 | Zhao | H04W 64/00 455/456.2 |
| 2016/0192317 A1 | 6/2016 | Khandekar et al. | |
| 2016/0195601 A1 | 7/2016 | Siomina et al. | |
| 2017/0019875 A1 | 1/2017 | Fischer | |

FOREIGN PATENT DOCUMENTS

| | | |
|---|---|---|
| EP | 1742080 A1 | 1/2007 |
| JP | 2002101445 | 4/2002 |
| JP | 2003035762 A | 2/2003 |
| JP | 2004108903 A | 4/2004 |
| JP | 2006325218 A | 11/2006 |
| JP | 2007537613 A | 12/2007 |
| JP | 2012530394 A | 11/2012 |
| TW | 201116112 A | 5/2011 |
| TW | 201235688 A | 9/2012 |
| WO | WO-02087275 | 10/2002 |
| WO | WO-2004077698 A1 | 9/2004 |
| WO | WO-2004079387 A2 | 9/2004 |
| WO | WO-2004080105 A2 | 9/2004 |
| WO | WO-2004095733 A2 | 11/2004 |
| WO | WO-2005062066 A2 | 7/2005 |
| WO | WO-2005103753 A1 | 11/2005 |
| WO | WO-2006031034 A1 | 3/2006 |
| WO | WO-2006076600 A1 | 7/2006 |
| WO | WO-2008100351 A2 | 8/2008 |
| WO | WO-2009009511 A2 | 1/2009 |
| WO | WO-2009070464 A1 | 6/2009 |
| WO | WO-2009079103 | 6/2009 |
| WO | WO-2010144765 A1 | 12/2010 |
| WO | 2011139201 A1 | 11/2011 |
| WO | 2012067328 A1 | 5/2012 |
| WO | WO-2014086409 A1 | 6/2014 |

OTHER PUBLICATIONS

3GPP, "3rd Generation Partnership Project; Technical Specification Group Radio Access Network; Coordinated multi-point operation for LTE physical layer aspects (Release 11)", 3GPP TR 36.819 V11.2.0 (Sep. 2013), 70 pages.

3GPP, "3rd Generation Partnership Project; Technical Specification Group Radio Access Network; Evolved Universal Terrestrial Radio Access (E-UTRA); LTE Positioning Protocol (LPP) (Release 12)", 3GPP TS 36.355 V12.2.0 (Jun. 2014), 126 pages.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0 (Sep. 2014), 124 pages.

3GPP, "3rd Generation Partnership Project; Technical Specification Group Radio Access Network; Evolved Universal Terrestrial Radio Access (E-UTRA); Physical layer; Measurements (Release 12)", 3GPP TS 36.214 V12.0.0 (Sep. 2014), 14 pages.

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.5.0 (Sep. 2014), 877 pages.

3GPP, "3rd Generation Partnership Project; Technical Specification Group Radio Access Network; Further Advancements for E-UTRA Physical Layer Aspects (Release 9)", 3GPP TR 36.814 V1.7.0(Feb. 2010), 85 pages.

3GPP, "3rd Generation Partnership Project; Technical Specification Group Radio Access Network; Small cell enhancements for E-UTRA and E-UTRAN—Physical layer aspects (Release 12)", 3GPP TR 36.872 V12.1.0 (Dec. 2013), 100 pages.

3GPP, "3rd Generation Partnership Project; Technical Specification Group Radio Access Network; Study on 3D channel model for LTE (Release 12)", 3GPP TR 36.873 V12.0.0 (Sep. 2014), 42 pages.

3GPP, "3rd Generation Partnership Project; Technical Specification Group Radio Access Network; Study on Indoor Positioning Enhancements for UTRA and LTE (Release 13)", 3GPP TR 37.857 V0.0.2 (Oct. 2014), 8 pages.

3GPP, "3rd Generation Partnership Project; Technical Specification Group Services and System Aspects; Location Services (LCS); Service description; Stage 1 (Release 12)", 3GPP TS 22.071 V12.0.0 (Oct. 2014), 50 pages.

"3rd Generation Partnership Project; Technical Specification Group Services and System Aspects; Vocabulary for 3GPP Specifications," Release 12, 3 GPP TR 21.905, Version 12.0.0, Jun. 2013, 64 pp.

Co-pending U.S. Appl. No. 14/921,836, filed Oct. 23, 2015.

Intel Corporation, "OTDOA Performance in Shared Cell ID Scenario", 3GPP TSG RAN WG1 Meeting #80bis, R1-151444, Belgrade, Serbia, Apr. 20-24, 2015, 4 pages.

NextNav, "Revised SID: Study on Indoor Positioning Enhancements for UTRA and LTE", 3GPP TSG RAN Meeting #65, RP-141102, Edinburgh, Scotland, Sep. 9-12, 2014, 7 pages.

Nokia Networks, "Potential enhancements for OTDOA", 3GPP TSG-RAN WG1 #80b, R1-151833, Belgrade, Serbia, Apr. 21-24, 2015, 2 pages.

(56) References Cited

OTHER PUBLICATIONS

NTT Docomo, "Chairman's Note on Simulation Assumptions for UTDOA", 3GPP TSG RAN WG1 #61 Meeting, R1-103410, Montreal, Canada, May 10-14, 2010, 4 pages.
Qualcomm Incorporated, "Indoor Positioning Simulation Results", 3GPP TSG-RAN WG1 Meeting #80bis, R1-152192, Belgrade, Serbia, Apr. 20-24, 2015, 16 pages.
Qualcomm Incorporated, "OTDOA Positioning Enhancements", 3GPP TSG-RAN WG1 Meeting #80bis, R1-151422, Belgrade, Serbia, Apr. 20-24, 2015,10 pages.
Session Chairman (Qualcomm Inc.), "Summary of Ad-hoc session on Study on Indoor Positioning Enhancements for UTRA and LTE", 3GPP TSG RAN WG1 Meeting #80bis, R1-152378, Belgrade, Serbia, Apr. 20-24, 2015, 3 pages.
Taiwan Search Report—TW102143921—TIPO—Aug. 4, 2015.
3GPP RAN WG1 #57bis R1-092305, "Positioning Support for Distributed Network Elements", LG-Nortel, p. 103, Jun. 29-Jul. 3, 2009.
Vodafone Group, et al., "Tracking Areas in eNB", 3GPP TSG RAN WG3 #56, R3-071030, 3 Pages.

\* cited by examiner

300

350

POSITIONING REFERENCE SIGNAL (PRS) GENERATION FOR MULTIPLE TRANSMIT ANTENNA SYSTEMS

CROSS REFERENCE TO RELATED APPLICATIONS

This application claims the benefit of and priority to U.S. Provisional Application No. 61/745,742 entitled "Positioning Reference Signal (PRS) Generation for Multiple Transmit Antenna Systems," filed Dec. 24, 2012, which is assigned to the assignee hereof and incorporated by reference, in its entirety, herein.

FIELD

The subject matter disclosed herein relates to Positioning Reference Signal (PRS) generation for multiple transmit antenna systems.

BACKGROUND

It is often desirable to know the location of a terminal such as a cellular phone. For example, a location services (LCS) client may desire to know the location of a terminal in the case of an emergency services call or to provide some service to the user of the terminal such as navigation assistance or direction finding. The terms "location" and "position" are synonymous and are used interchangeably herein.

In Observed Time Difference of Arrival (OTDOA) based positioning, the mobile station may measure time differences in received signals from a plurality of base stations. Because positions of the base stations are known, the observed time differences may be used to calculate the location of the terminal. To further help location determination, Positioning Reference Signals (PRS) are often provided by a base station (BS) in order to improve OTDOA positioning performance. The measured time difference of arrival of the PRS from a reference cell (e.g. the serving cell) and one or more neighboring cells is known as the Reference Signal Time Difference (RSTD). Using the RSTD measurements, the absolute or relative transmission timing of each cell, and the known position(s) of BS physical transmitting antenna element(s) for the reference and neighboring cells, the UE's position may be calculated.

However, when Base Stations (BS) use multiple physical transmitting antenna elements and the physical transmitting antenna elements are switched between PRS occasions, UE's that utilize multiple PRS occasions and coherent averaging/integration over the multiple PRS occasions to determine a Time of Arrival (TOA) value may obtain incorrect results because different propagation channels may have been used for different PRS occasions. Similarly, in a conventional distributed antenna system (DAS) spatially separate physical transmitting antenna elements, which belong to the same cell and share the same cell Physical Cell Identifier (PCI), transmit the same PRS signal. Consequently, in conventional DAS, the location of the signal transmitter in the DAS case may be ambiguous, and UE position calculation may be erroneous or not be possible. Position calculation is also ambiguous in traditional systems using low power Remote Radio Heads (RRHs) within a macrocell coverage area because the transmission points created by the spatially separate RRHs may have the same PCIs as the macro cell and consequently transmit identical PRS signals.

Therefore, there is a need for apparatus, systems and methods to improve position determinations and permit the use of PRS signals for location determination in situations where antenna diversity schemes, DAS, and/or RRH systems are being used.

SUMMARY

In some embodiments, a method of providing Observed Time Difference of Arrival (OTDOA) assistance information from a server may comprise: sending the OTDOA assistance information to a mobile station (MS), the OTDOA assistance information comprising Positioning Reference Signal (PRS) assistance information including antenna switching assistance information for at least one cell in a subset of cells served by the server. In one embodiment, the method may be implemented on a location server for the at least one cell.

In some embodiments, the antenna switching assistance information may further comprise one or more Boolean parameters, and wherein each of the one or more Boolean parameters corresponds to a cell in the subset of cells served by the server, and indicates whether physical transmitting antenna element switching occurs between PRS positioning occasions for the corresponding cell. In some embodiments, the antenna switching assistance information may further comprise information pertaining to an antenna switching interval, the antenna switching interval being specified in terms of a number of consecutive PRS positioning occasions transmitted on a physical transmitting antenna element in the at least one cell before the physical transmitting antenna element is switched. In some embodiments, the antenna switching assistance information may further comprise at least one of: antenna switching pattern information and/or antenna muting pattern information. The OTDOA assistance information may be sent to the MS using Long Term Evolution (LTE) Positioning Protocol (LPP) or LPP extensions (LPPe) messages.

Disclosed embodiments also pertain to a server comprising: a communications interface, the communications interface to send Observed Time Difference of Arrival (OTDOA) assistance information to a mobile station; and a processor coupled to the communications interface, the processor configured to generate the OTDOA assistance information for at least one cell in a subset of cells served by the server, the OTDOA assistance information comprising Positioning Reference Signal (PRS) assistance information including antenna switching assistance information for the at least one cell.

Other embodiments pertain to a server comprising: means for sending Observed Time Difference of Arrival (OTDOA) assistance information to a mobile station; and processing means coupled to the means for sending OTDOA assistance information, the processing means to generate the OTDOA assistance information for at least one cell in a subset of cells served by the server, the OTDOA assistance information comprising Positioning Reference Signal (PRS) assistance information including antenna switching assistance information for at least one cell.

Disclosed embodiments pertain to a non-transitory computer-readable medium comprising instructions which, when executed by a processor, perform steps in a method for providing Observed Time Difference of Arrival (OTDOA) assistance information from a server. In some embodiments, the steps may comprise: sending the OTDOA assistance information to a mobile station, the OTDOA assistance information comprising Positioning Reference Signal (PRS)

assistance information including antenna switching assistance information for at least one cell in a subset of cells served by the server.

Additional embodiments pertain to a method comprising: receiving Observed Time Difference of Arrival (OTDOA) assistance information at a mobile station (MS), wherein the OTDOA assistance information comprises Positioning Reference Signal (PRS) assistance information including antenna switching assistance information for at least one cell; determining whether physical transmitting antenna element switching is used by the at least one cell based, at least in part, on the received antenna switching assistance information; and if physical transmitting antenna element switching is used by the at least one cell, then, selecting a Time of Arrival (TOA) value for a PRS from a set of TOA values determined based on measurements at the MS during a single PRS positioning occasion, wherein the PRS is received by the MS and the selected TOA value is indicative of a shorter distance between a source of the PRS and the MS than other TOA values in the set of TOA values. In some embodiments, the OTDOA assistance information may be transmitted by a location server for the at least one cell. In some embodiments, the position of a mobile station may be determined based, at least in part, on the OTDOA assistance information.

Further, disclosed embodiments pertain to a mobile station (MS) comprising: a transceiver capable of receiving a Positioning Reference Signal (PRS) and Observed Time Difference of Arrival (OTDOA) assistance information, wherein the OTDOA assistance information comprises PRS assistance information including antenna switching assistance information for at least one cell; and a processor coupled to the transceiver. In some embodiments, the processor may be configured to: determine whether physical transmitting antenna element switching is used by the at least one cell based, at least in part, on the received antenna switching assistance information, and select a Time of Arrival (TOA) value for the PRS from a set of TOA values determined based on measurements during a single PRS positioning occasion, wherein the PRS is received by the MS and the selected TOA value is indicative of a shorter distance between a source of the PRS and the MS than other TOA values in the set of TOA values, if physical transmitting antenna element switching is used by the at least one cell.

Disclosed embodiments also pertain to a mobile station comprising: transceiver means, the transceiver means to receive a Positioning Reference Signal (PRS) and Observed Time Difference of Arrival (OTDOA) assistance information, wherein the OTDOA assistance information comprises PRS assistance information including antenna switching assistance information for at least one cell; and processing means coupled to the transceiver means. In some embodiments, the processing means may further comprise: means for determining whether physical transmitting antenna element switching is used by the at least one cell based, at least in part, on the received antenna switching assistance information, and means for selecting a Time of Arrival (TOA) value for the PRS from a set of TOA values determined based on measurements during a single PRS positioning occasion, wherein the PRS is received by the mobile station (MS) and the selected TOA value is indicative of a shorter distance between a source of the PRS and the MS than other TOA values in the set of TOA values, if physical transmitting antenna element switching is used by the at least one cell.

Further, disclosed embodiments pertain to non-transitory computer-readable media comprising instructions, which when executed by a processor, perform steps in a method, where the steps may comprise: receiving Observed Time Difference of Arrival (OTDOA) assistance information at a mobile station (MS), wherein the OTDOA assistance information comprises Positioning Reference Signal (PRS) assistance information including antenna switching assistance information for at least one cell; determining whether physical transmitting antenna element switching is used by the at least one cell based, at least in part, on the received antenna switching assistance information; and if physical transmitting antenna element switching is used by the at least one cell, then, selecting a Time of Arrival (TOA) value for a PRS from a set of TOA values determined based on measurements at the MS during a single PRS positioning occasion, wherein the PRS is received by the MS and the selected TOA value is indicative of a shorter distance between a source of the PRS and the MS than other TOA values in the set of TOA values.

In some embodiments, a method of generating a Positioning Reference Signal (PRS) sequence for a system comprising a plurality of physical transmitting antenna elements serving a single cell. In some embodiments, the method may comprise: assigning a distinct Physical Antenna Port (PAP) identifier (ID) to a subset of the plurality of physical transmitting antenna elements; and generating PRS sequences for the subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on the PAP ID (h) of the corresponding physical transmitting antenna element. In some embodiments, $f(PAP_h)$ may be set to 0 for at least one of the physical transmitting antenna elements in the subset.

In one embodiment, the plurality of physical transmitting antenna elements may comprise a Distributed Antenna System (DAS). In another embodiment, the plurality of physical transmitting antenna elements are realized using Remote Radio Heads (RRHs). In some embodiments, the PAP ID may be transmitted as part of Observed Time Difference of Arrival (OTDOA) assistance information by a location server. In some instances, transmission of the PAP ID by the location server may be based, at least in part, on received information indicating a capability to generate a replica PRS sequence at a mobile station in communication with the location server.

Disclosed embodiments also pertain to an apparatus comprising: a transceiver capable of transmitting Observed Time Difference of Arrival (OTDOA) assistance information to a mobile station; and a processor coupled to the transceiver, the processor configured to generate the OTDOA assistance information for at least one cell, the OTDOA assistance information comprising Positioning Reference Signal (PRS) assistance information including antenna switching assistance information for at least one cell.

Other embodiments pertain to an apparatus comprising: a communications interface, the communications interface to send Observed Time Difference of Arrival (OTDOA) assistance information to a mobile station (MS), wherein OTDOA assistance information comprises Physical Antenna Port (PAP) identifiers (IDs); and a processor coupled to the communications interface. In some embodiments, the processor may be configured to: assign a distinct PAP ID to each of a plurality of physical transmitting antenna elements serving a single cell, and generate PRS sequences for a subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on a PAP ID (h) of the corresponding physical transmitting antenna element.

In another embodiment, an apparatus is disclosed comprising communications means, the communications means configured to send Observed Time Difference of Arrival (OTDOA) assistance information to a mobile station (MS), wherein OTDOA assistance information comprises Physical Antenna Port (PAP) identifiers (IDs); and processing means coupled to the communications means. In some embodiments, the processing means may further comprise: means for assigning a distinct PAP ID to each of a plurality of physical transmitting antenna elements serving a single cell, and means for generating PRS sequences for a subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on a PAP ID (h) of the corresponding physical transmitting antenna element.

Disclosed embodiments also pertain to non-transitory computer readable media comprising instructions, which, when executed by a processor, perform steps in a method of generating a Positioning Reference Signal (PRS) sequence for a system comprising a plurality of physical transmitting antenna elements serving a single cell. In some embodiments, the steps may comprise: assigning a distinct Physical Antenna Port (PAP) identifier (ID) to a subset of the plurality of physical transmitting antenna elements; and generating PRS sequences for the subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on a PAP ID (h) of the corresponding physical transmitting antenna element.

The methods disclosed may be performed by one or more of servers (including location servers), mobile stations, etc. using LPP, LPPe or other protocols. Embodiments disclosed also relate to software, firmware, and program instructions created, stored, accessed, read or modified by processors using non-transitory computer readable media or computer readable memory.

DETAILED DESCRIPTION

The terms "mobile station" (MS), "user equipment" (UE) or "target" are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "mobile station."

Figure 1A:
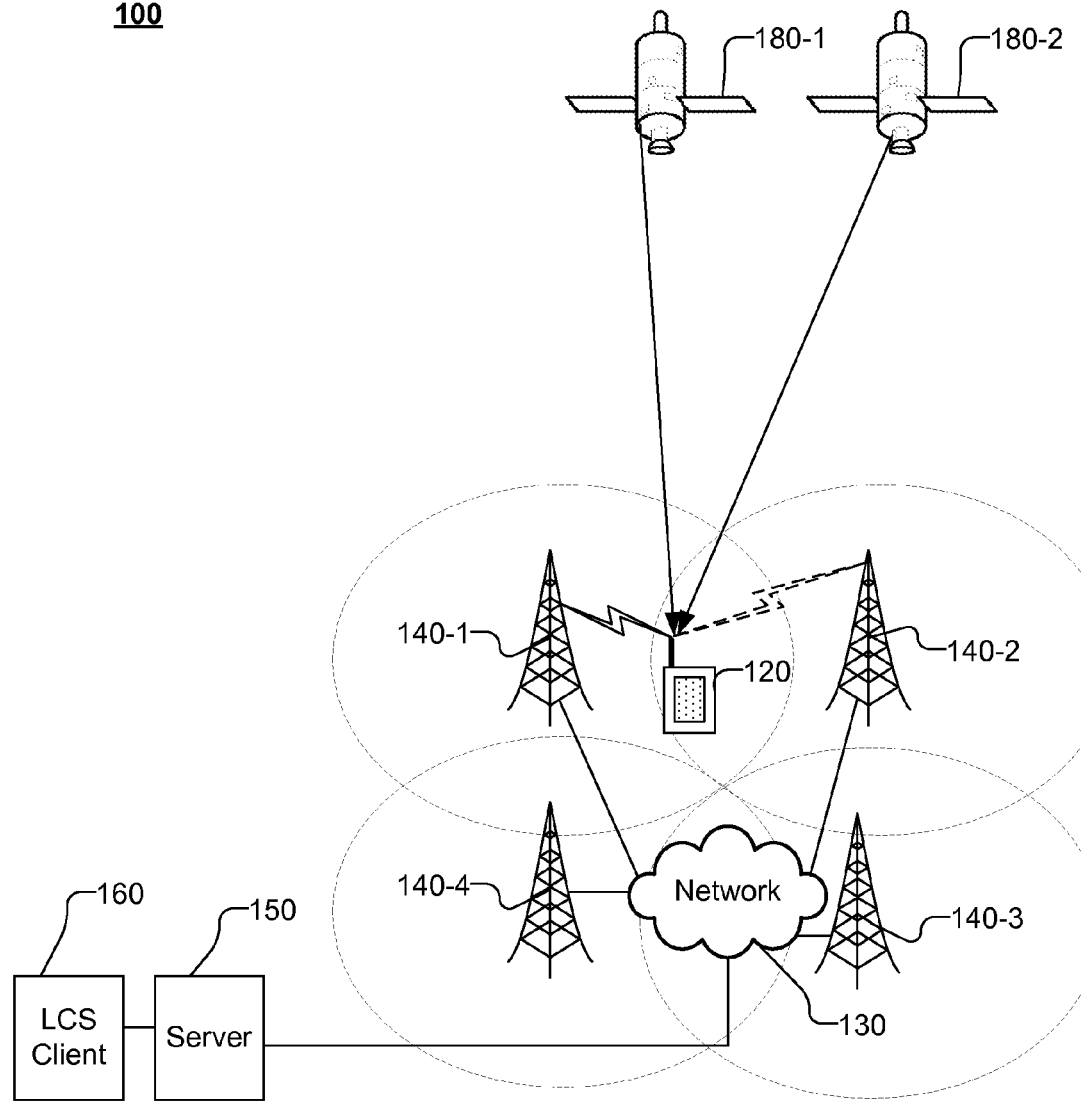
FIG. 1A shows an architecture of an exemplary system capable of providing Location Services to UEs including the transfer of location assistance data or location information.

FIG. 1A shows an architecture of a system 100 capable of providing Location Services to UEs including the transfer of location assistance data or location information, using messages such as Long Term Evolution (LTE) Positioning Protocol (LPP) or LPP extensions (LPPe) messages between MS 120 and server 150, which, in some instances, may take the form of a location server or another network entity. The transfer of the location information may occur at a rate appropriate to both MS 120 and server 150. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In many instances, a BS may use multiple physical transmitting antenna elements 140. For example, in urban environments, there may often be no clear line-of-sight (LOS) between a transmitter and MS 120 so that signals may be reflected along multiple paths before reception. These reflections can introduce phase shifts, time delays, attenuations, and distortions that can destructively interfere with one another at the receiving terminal.

In some embodiments, system 100 may use antenna diversity schemes, and/or a RRH system or DAS with multiple RRH transmitting elements or multiple physical transmitting antenna elements 140-1, 140-2, 140-3 and 140-4 (sometimes collectively referred to as physical transmitting antenna elements 140) to reduce multipath interference and for other reasons. For example, system 100 may be a DAS, which is a network of spatially separated physical transmitting antenna elements 140-1, 140-2, 140-3 and 140-4 connected to a common source. The DAS' may replace a single physical transmitting antenna element radiating at high power in a cell with a group of physical transmitting antenna elements 140-1, 140-2, 140-3 and 140-4 that cover the same cell. The DAS may permit coverage over the same area as a single physical transmitting antenna element but with reduced total power and improved reliability. For example, a single base station and a group of low power physical transmitting antenna elements 140-1, 140-2, 140-3 and 140-4 may be used to provide wireless coverage for an entire building, a city block, a campus, or another area.

As another example, system 100 may take the form of a Remote Radio Head (RRH) system where a network of radio transmitters, which may be physically remote from a BS, are connected to the BS using fiber optic cables or other high speed links. For example, multiple physical transmitting antenna elements 140 or RRH transmitting elements may collectively serve a single cell, and RRHs may be used to extend the coverage of a BS into tunnels, rural areas etc.

For simplicity, only one MS 120 and server 150 are shown in FIG. 1A. In general, system 100 may comprise multiple cells with additional networks 130, LCS clients 160, mobile stations 120, servers 150, physical transmitting antenna elements 140, and Space Vehicles (SVs) 180. System 100 may further comprise a mix of cells using some combination of a single physical transmitting antenna element, antenna diversity schemes, DAS, and/or RRHs in a manner consistent with embodiments disclosed herein.

MS 120 may be capable of wirelessly communicating with server 150 through one or more networks 130 that support positioning and location services, which may include but is not limited to the Secure User Plane Location (SUPL) location solution defined by OMA and the Control Plane location solution defined by 3GPP for use with an LTE serving network. For example, Location services (LCS) may be performed on behalf of LCS Client 160 that accesses server 150 (which may take the form of a location server) and issues a request for the location of MS 120. Server 150 may then respond to LCS client 160 with a location estimate for MS 120. LCS Client 160 may also be known as a SUPL Agent—e.g. when the location solution used by server 150 and MS 120 is SUPL. In some embodiments, MS 120 may also include an LCS Client or a SUPL agent (not shown in FIG. 1A) that may issue a location request to some positioning capable function within MS 120 and later receive back a location estimate for MS 120. The LCS Client or SUPL Agent within MS 120 may perform location services for the user of MS 120—e.g. provide navigation directions or identify points of interest within the vicinity of MS 120.

Server 150 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 1A, the MS 120 may communicate with server 150 through network 130 and physical transmitting antenna elements 140, which may be associated with network 130. MS 120 may receive and measure signals from physical transmitting antenna elements 140, which may be used for position determination. In some embodiments, physical transmitting antenna elements 140 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, physical transmitting antenna elements 140 and network 130 may form part of, e.g., an evolved UMTS Terrestrial Radio Access Network (E-UTRAN) (LTE) network, a W-CDMA UTRAN network, a GSM/EDGE Radio Access Network (GERAN), a 1xRTT network, an Evolution-Data Optimized (EvDO) network, a WiMax network or a WLAN.

MS 120 may also receive signals from one or more Earth orbiting Space Vehicles (SVs) 180-1 or 180-2 collectively referred to as SVs 180, which may be part of a satellite positioning system (SPS). SVs 180, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 1B:
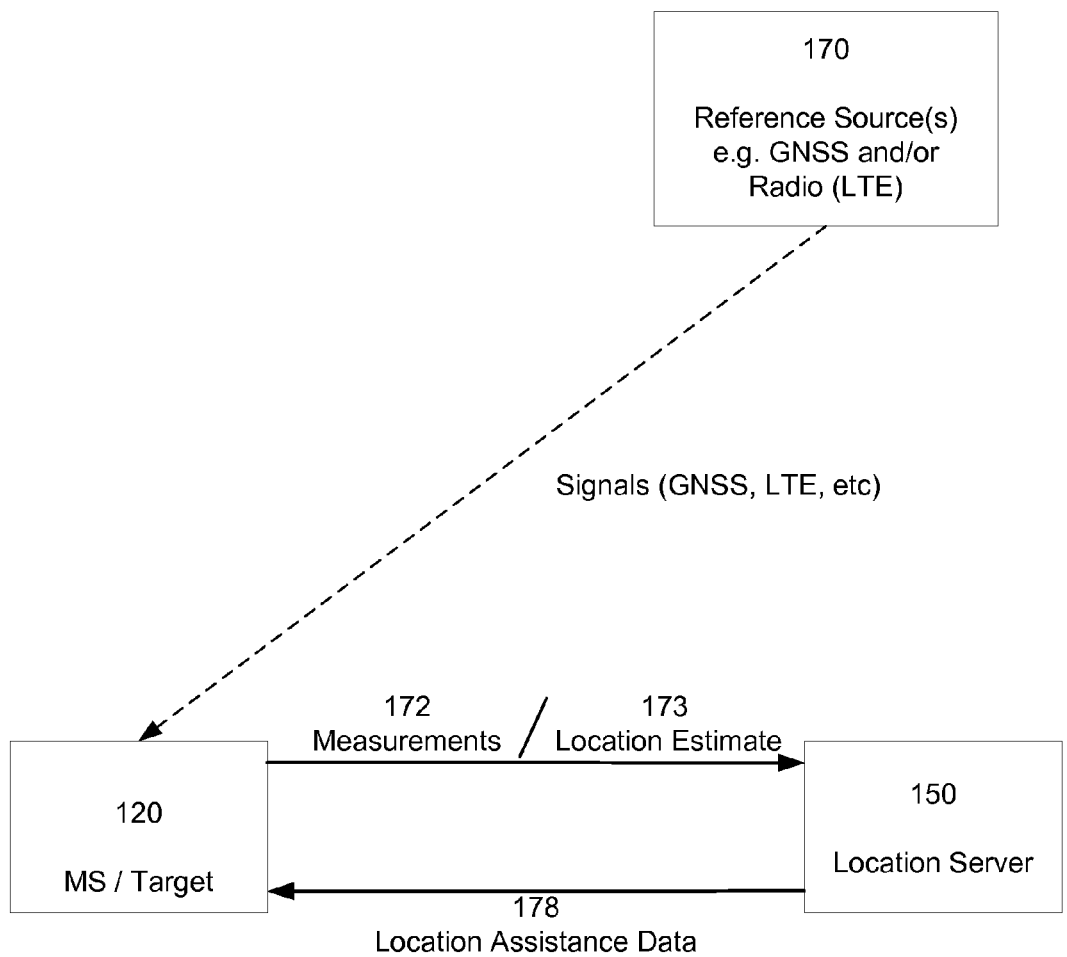
FIG. 1B is a simplified block diagram illustrating the provision Location Services to UEs including the transfer of location assistance data or location information.

FIG. 1B shows a simplified block diagram illustrating some entities in a system 175 capable of determining the location of MS 120. Referring to FIG. 1B, MS 120 may measure signals from reference source(s) 170 to obtain measurements and/or location estimate 173. Reference source(s) 170 may represent signals from SVs 180 and/or physical transmitting antenna elements 140 associated with network 130. Accordingly, MS 120 may obtain measurements 172 by measuring pseudo-range measurements for SVs 180 and/or OTDOA related measurements from physical transmitting antenna elements 140. In some instances, MS 120 may also obtain a location estimate 173 by using measurements 172, which may be pseudo-range and/or OTDOA related measurements to derive an estimated position for MS 120. MS 120 may provide location related information, such as location estimate 173 or measurements 172 (e.g., satellite measurements from one or more GNSSs, or network measurements such as RSTDs from one or more networks, etc.) to server 150.

In some instances, the OTDOA related measurements taken by MS 120 may be sent to server 150 to derive a position estimate for MS 120. Server 150 may provide location related information, such as an approximate location of MS 120 and/or location assistance data 178 to MS 120, which may be used to assist MS 120 in acquiring and measuring signals from SVs 180 and physical transmitting antenna elements 140, and/or in deriving or refining a location estimate 173 from these measurements 172. For example, MS 120, which in some instances may take the form of a Secure User Plane (SUPL) Enabled Terminal (SET), may communicate with server 150 and use location assistance data 178 obtain a location estimate for MS 120, which may then be communicated to LCS client 160 (not shown in FIG. 1B).

Referring to FIG. 1A, in some embodiments, physical transmitting antenna elements 140 may also transmit Positioning Reference Signals (PRS). PRS, which have been defined in 3GPP Long Term Evolution (LTE) Release-9, are transmitted by a base station in special positioning subframes that are grouped into positioning occasions. For example, in LTE, the positioning occasion, which can comprise 1, 2, 4, or 6 consecutive positioning subframes, occurs periodically at 160, 320, 640, or 1280 millisecond intervals.

Within each positioning occasion, PRSs are transmitted with a constant power. PRS can also be transmitted with zero power (i.e., muted). Muting, which turns off a regularly scheduled PRS transmission, may be useful when PRS patterns between cells overlap. Muting aids signal acquisition by MS 120. Muting may be viewed as the non-transmission of a PRS for a given positioning occasion in a particular cell. Muting patterns may be signaled to MS 120 using bitstrings. For example, in a bitstring signaling a muting pattern, if a bit at position j is set to "1", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift is defined as a function of the Physical Cell Identifier (PCI) resulting in an effective frequency re-use factor of 6.

The PRS sequence transmitted by a cell is specified in 3GPP standards and technical specifications as follows:

$$r_{l,n_s}(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots 2N_{RB}^{max,DL} - 1$$

where,
$n_s$ is the slot number within a radio frame (slot=0.5 ms; frame=10 ms), $n_s$=0 . . . 19;
l is the OFDM symbol number within the slot;
  l=0 . . . 6 for normal cyclic prefix; and
  l=0 . . . 5 for extended cyclic prefix.
c(i) is a length-31 Gold sequence
$N_{RB}^{max,DL}$ is the largest downlink bandwidth configuration, expressed in multiples of $N_{sc}^{RB}$;
$N_{sc}^{RB}$ is the resource block size in the frequency domain, expressed as a number of subcarriers.
$N_{sc}^{RB}$=12 subcarriers for PRS, with 15 kHz spacing (180 kHz total).

A Gold sequence is a binary sequence used in telecommunication and satellite navigation and is useful when multiple devices are broadcasting in the same frequency range because a set of Gold code sequences have small bounded cross-correlations.

The pseudo-random sequence generator for c(i) is initialized with $$c_{init} = 2^{10} \cdot (7 \cdot (n_s+1) + l+1) \cdot (2 \cdot N_{ID}^{cell}+1) + 2 \cdot N_{ID}^{cell} + N_{CP} \quad (2)$$

at the start of each OFDM symbol where $$N_{CP} = \begin{cases} 1 & \text{for normal Cyclic Prefix} \\ 0 & \text{for extended Cyclic Prefix} \end{cases}$$

$N_{ID}^{cell}$ Physical layer Cell Identity (PCI).

$N_{ID}^{cell}$ Physical layer Cell Identity (PCI).
The reference signal sequence is mapped to complex-valued QPSK modulation $a_{k,l}^{(p)}$ symbols used as reference signal for antenna port p=6 in slot $n_s$:

$$a_{k,l}^{(p)} = r_{l,n_s}(m')$$

where,

Normal cyclic prefix:

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

Extended cyclic prefix:

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 } PBCH \text{ antenna ports)} \\ 2, 4, 5 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

The bandwidth for positioning reference signals is $N_{RB}^{PRS}$ and the cell-specific frequency shift is given by $v_{shift} = N_{ID}^{cell} \bmod 6$. Therefore, the PRS transmitted by a cell is determined by the frame and slot timing of the cell ($n_s$, l), the cyclic prefix length ($N_{CP}$), and the PCI $N_{ID}^{cell}$.

PRS configuration parameters, such as the number of consecutive positioning subframes, periodicity, muting pattern, etc. may be decided by network 130 and may be signaled to MS 120 (e.g. by server 150) as part of the OTDOA assistance data. OTDOA assistance data may include reference cell information (PCI) and neighbor cell lists containing the PCI of neighbor cells and the PRS configuration parameters for the cells. OTDOA assistance information may allow a MS to determine when a PRS positioning occasion occurs on signals received from various cells, and to determine the PRS sequence transmitted from various cells to measure a TOA.

In conventional systems, antenna diversity is often used to mitigate multipath interference because each physical transmitting antenna element may experience a different interference environment thereby offering MS 120 several observations of the same signal. For example, if one physical transmitting antenna element is experiencing a deep fade, it is likely that another has a sufficient signal at the terminal. However, in conventional systems, the PRSs are transmitted from a single antenna port—port 6—and therefore, cannot exploit the diversity from multiple physical transmitting antenna elements. To overcome this limitation, in conventional systems, base stations may employ switching of physical transmit antenna elements for the PRS, where the physical transmitting antenna element is switched between PRS occasions. Accordingly, each PRS occasion may be transmitted from a single physical transmitting antenna element, but PRS occasions alternate between several physical transmitting antenna elements. In the above situation, if a UE uses multiple PRS occasions and coherent averaging/integration over the multiple PRS occasions to determine a Time of Arrival (TOA) value, then the TOA value obtained from coherent averaging would be incorrect because of the use of different propagation channels for different PRS occasions.

Similarly, in conventional systems using a DAS, UEs cannot correlate received PRS signals with individual DAS elements because geographically distributed DAS physical transmitting antenna elements, which belong to the same cell and share the same cell Physical Cell Identifier (PCI), transmit the same PRS signal. Consequently, the location of the signal transmitter in the DAS case may be ambiguous, and UE position calculation may not be possible.

Position calculation is also ambiguous in traditional systems using low power Remote Radio Heads (RRHs) within a macrocell coverage area because the transmission points created by the RRHs may have the same PCIs as the macro cell and consequently transmit identical PRS signals. For example, this may occur in some scenarios when using LTE-Advanced Cooperative Multi Point (CoMP) transmission. In these scenarios, UEs will not be able to correlate received PRS signals with individual RRH elements thereby creating ambiguity in location calculation.

Accordingly, in some embodiments, for example, in situations where antenna switching is used, OTDOA assistance information may include PRS assistance information, such as antenna switching assistance information indicating whether antenna switching for PRS transmission is used in a cell. In some embodiments, PRS assistance data sent to MS 120 may also include additional antenna switching assistance information. For example, server 150 may include antenna switching assistance information in OTDOA assistance data provided as part of the LPP or LPPe protocol.

In one embodiment, the antenna switching assistance information may include a Boolean parameter which indicates whether antenna switching between PRS positioning occasions occurs in a cell. The Boolean parameter for a cell may be set to TRUE, if antenna switching occurs in the cell, or to FALSE, if antenna switching does not occur in the cell. If set to TRUE for a cell, the Boolean parameter may indicate to MS 120 that coherent averaging over multiple PRS occasions should not be used for that cell. If set to FALSE for a cell, the Boolean parameter may indicate that MS 120 could use multiple PRS occasions coherently to determine a TOA value for location determination.

In another embodiment, MS 120 may use a single PRS positioning occasion to determine a time-of-arrival (TOA). If antenna switching assistance data indicates that antenna switching is used between PRS occasions, MS 120 may determine multiple TOA values, for example, by determining one TOA value every PRS occasion. In case of antenna switching, each TOA from a PRS positioning occasion may be slightly different because each PRS occasion may experience a different interference/channel environment. The UE may select the shortest TOA value among the set of TOA values as a final TOA measurement, since the shortest TOA value would be closer to the desired LOS delay for position calculation purposes.

If antenna switching assistance data indicates that antenna switching is not used between PRS occasions, MS 120 may not determine a set of TOA values as described above. If PRS are transmitted from a single physical transmitting antenna element (e.g., without physical transmitting antenna element switching), each PRS occasion may experience essentially the same radio channel, and therefore, determining multiple TOAs may be of no advantage. Accordingly, in some embodiments, MS 120 may use antenna switching assistance data advantageously to decide whether the determination of multiple TOA values would be useful, thereby conserving power and processor resources in situations where antenna switching is not used.

In another embodiment, the antenna switching assistance information may provide antenna switching pattern information. Antenna switching pattern information may be useful, for example, in situations where antenna switching is not performed for each PRS positioning occasion, but switching between physical transmitting antenna elements 140-1, 140-2, 140-3, and/or 140-4 may occur every $r^{th}$ PRS positioning occasion, where r≥1, is some integer. For example, for r=2, switching among physical transmitting antenna elements 140-1, 140-2, 140-3, and/or 140-4 may occur every second PRS positioning occasion.

In some embodiments, antenna switching pattern information may take the form of a bit string. The bit string could indicate, for example, when antenna switching occurs and how many PRS positioning occasions are transmitted before a physical transmitting antenna element is switched in the cell. In some embodiments, antenna switching pattern information may be provided using a matrix where each row of the matrix represents a physical transmitting antenna element, such as one of antennas 140-1, 140-2, 140-3, and 140-4, and each column represent a PRS positioning occasion. Accordingly, for example, a "1" at location (x, y) on the $x^{th}$ row and $y^{th}$ column of the matrix may indicate that a scheduled $y^{th}$ PRS positioning occasion is transmitted by the $x^{th}$ physical transmitting antenna element, while a "0" at location (x, y) may indicate that the scheduled $y^{th}$ positioning occasion PRS occasion is not transmitted by the $x^{th}$ physical transmitting antenna element. In some embodiments, switching information could be defined relative to a radio frame with System Frame Number 0 (SFN=0).

For example, in an instance with two physical transmitting antenna elements, antenna switching every PRS positioning occasion could be indicated by:

$$\text{Antenna Switching Pattern} = \begin{bmatrix} 0 & 1 \\ 1 & 0 \end{bmatrix}$$

In the above example, each row of the matrix may correspond to a physical transmitting antenna element and each column of the matrix may indicate a PRS occasion. In the example above, switching occurs every PRS positioning occasion.

A matrix to indicate antenna switching every second PRS positioning occasion may take the form $$\text{Antenna Switching Pattern} = \begin{bmatrix} 0 & 0 & 1 & 1 \\ 1 & 1 & 0 & 0 \end{bmatrix}$$

The matrix above may indicate that physical transmitting antenna element 140-1 transmits PRS positioning information for the second two PRS positioning occasions, while physical transmitting antenna element 140-2 transmits PRS positioning information for the first two PRS positioning occasions. Referring to FIG. 3B, for DAS 350, with physical transmitting antenna elements 140-1, 140-2, 140-3, and 140-4 a matrix to indicate switching every second PRS positioning occasion may take the form $$\text{Antenna Switching Pattern} = \begin{bmatrix} 0 & 0 & 1 & 1 & 0 & 0 & 0 & 0 \\ 1 & 1 & 0 & 0 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix}$$

The matrix above indicates that physical transmitting antenna element 140-2 transmits for the first two PRS positioning occasions, followed by physical transmitting antenna element 140-1, which transmits for the next two PRS positioning occasions, followed in turn by physical transmitting antenna element 140-3 for the two subsequent PRS positioning occasions, which is then followed by physical transmitting antenna element 140-4 for the next two PRS positioning occasions. Note that the use of matrices to specify antenna switching patterns is exemplary and for descriptive purposes only and various other representations are envisaged as would be apparent to one of ordinary skill in the art.

The 3GPP standard and technical specifications also define logical antenna ports for the downlink to MS 120. An "antenna port" or a "logical antenna port" is generally used as a generic term for signal transmission under identical channel conditions. Antenna ports are logical entities that are dynamically mapped to physical transmitting antenna elements 140 or Physical Antenna Ports (PAPs). Logical antenna ports may be viewed as logical channels that are characterized by the information they transfer, whereas, physical transmitting antenna elements may be viewed as transport channels characterized by how the information is transferred. The dynamic mapping of logical antenna ports to physical transmitting antenna elements thus maps logical channels to transport channels by assigning logical antenna ports to physical transmitting antenna elements.

For each LTE operating/transmission mode in the downlink direction for which an independent channel is assumed (e.g. Single Input and Single Output (SISO) vs. Multiple In Multiple Out (MIMO)), a separate logical antenna port is defined. LTE symbols that are transmitted via identical logical antenna ports are subject to the same channel conditions. The mapping of logical antenna ports to physical transmitting antenna elements of a BS may depend on BS implementation.

In some embodiments, for example, where physical transmitting antenna elements 140 represent a DAS with antennas 140-1, 140-2, 140-3 and 140-4, logical antenna port 6, which is used for PRS transmission, may be mapped to Physical Antenna Ports (PAPs), and a PRS sequence may be generated as a function of the Physical Antenna Port Identifier (PAP ID). Similarly, in situations where a cell is served by multiple RRHs, logical antenna port 6 on the RRHs may be mapped to PAPs, and a PRS sequence may be generated as a function of the PAP ID. For example, in one implementation, in order to distinguish PRSs at different physical transmitting antenna elements for a particular eNodeB (BS) with PCI $N_{ID}^{cell}$, the initialization seed for the PRS sequence may be a function of the PAP. Accordingly, in some embodiments, $c_{init}$, in initialization equation (2), above, may be modified for a PAP as, $$c_{init} = 2^{10} \cdot (7 \cdot (n_s + 1) + l1) \cdot (2 \cdot N_{ID}^{cell} + 1) + 2 \cdot N_{ID}^{cell} + N_{CP} + f \\ (PAP_h) \quad (3)$$

where $PAP_h$ corresponds to physical antenna port h, for $0 \le h \le \eta_{pap}$, and $\eta_{pap}$ is the number of physical antenna ports. Because $c_{init}$ in Equation (3) above is a function of PAP ID $PAP_h$, in some embodiments, a different PRS sequence may be transmitted from each DAS physical transmitting antenna element or RRH.

In some embodiments, server 150 may transmit the PAP ID as part of OTDOA assistance information by server 150. Further, the PAP ID may be transmitted as part of OTDOA assistance information based, in part, on received information indicating a capability to generate a replica PRS sequence at MS 120 in communication with server 150.

In some embodiments, equation (3) may be used with antenna diversity schemes because antenna switching may be considered as equivalent to mapping the antennas to PAPs and applying a muting pattern for each physical transmitting antenna element where PRS occasions are muted alternately between the physical transmitting antenna elements. In some embodiments, the logical antenna port 6 may be mapped to multiple PAPs based on the number of physical transmitting antenna elements switched. For example, in the case of two physical transmitting antenna elements, logical antenna port 6 may be assigned to two PAPs, $PAP_0$ and $PAP_1$. According to equation (3) above, $PAP_0$ and $PAP_1$ would transmit a different PRS sequence. Further, in the example above, in some embodiments, antenna switching may be indicated using a muting pattern defined in the OTDOA assistance data, to indicate that one PAP is muted during PRS transmissions of the other PAP.

In some embodiments, where different PRS sequences are transmitted (as described above) by different PAPs each associated with a physical transmitting antenna element at a different location (e.g. as for a cell with multiple RRHs), additional OTDOA assistance data may be provided to MS 120 to assist acquisition and measurement of each PRS sequence. As an example, the approximate expected RSTD for each PRS sequence may be provided and/or the location or relative location of each of physical transmitting antenna elements 140.

In addition, in some embodiments, to ensure that legacy mobile stations are not affected by the above PRS related changes, mobile station capability indication for PAPs may be added to the OTDOA capabilities defined in LPP or LPPe. In one embodiment, for example, to ensure legacy support, one physical transmitting antenna element, such physical transmitting antenna element 140-1 with PAP ID $PAP_0$, may not change its PRS sequence, which may be achieved by setting $f(PAP_h)=0$, for h=0, in equation (3) Accordingly, in the previous example, the PRS sequence may be unchanged for $PAP_0$, thereby providing support for legacy mobile stations.

In some embodiments, where mobile station capability information from MS 120 indicates support for multi-PRS sequences (i.e., multiple PRS sequences for a single PCI) from the same cell/PCI, server 150 may include such cells in OTDOA assistance data and MS 120 may undertake OTDOA measurements from transmitters in a DAS or RRH system, since physical transmitter locations may be mapped to the multi-PRS sequence.

If mobile station capability information from MS 120 indicates a lack of support for multi-PRS sequences from the same cell/PCI, server 150, may not include such cells in OTDOA assistance data. As outlined earlier, because OTDOA positioning would be impractical for legacy mobile stations in cells with DAS or RRHs, such cells may already be omitted from OTDOA assistance information provided by server 150. Accordingly, the omission of multi-PRS cells from OTDOA assistance data may have minimal or no impact for legacy mobile stations.

In some embodiments, MS 120 may use the PCI, in conjunction with multi-PRS sequences and/or OTDOA assistance data comprising one or more of: PRS assistance information, antenna switching assistance information, antenna switching pattern information, and/or muting information to make OTDOA measurements. In some embodiments, MS 120 may make OTDOA measurements using the above information in cells with antenna diversity, DAS, or RRH systems.

In some embodiments, the OTDOA measurements may be used by MS 120 and/or server 150 to determine the location of MS 120. For OTDOA positioning, by unambiguously identifying cells, physical transmitting antenna elements 140, or RRHs from which the OTDOA measurements have been made, MS 120 or server 150 may use the actual location of physical transmitting antenna elements 140, which can then be utilized for position calculation.

Figure 2:
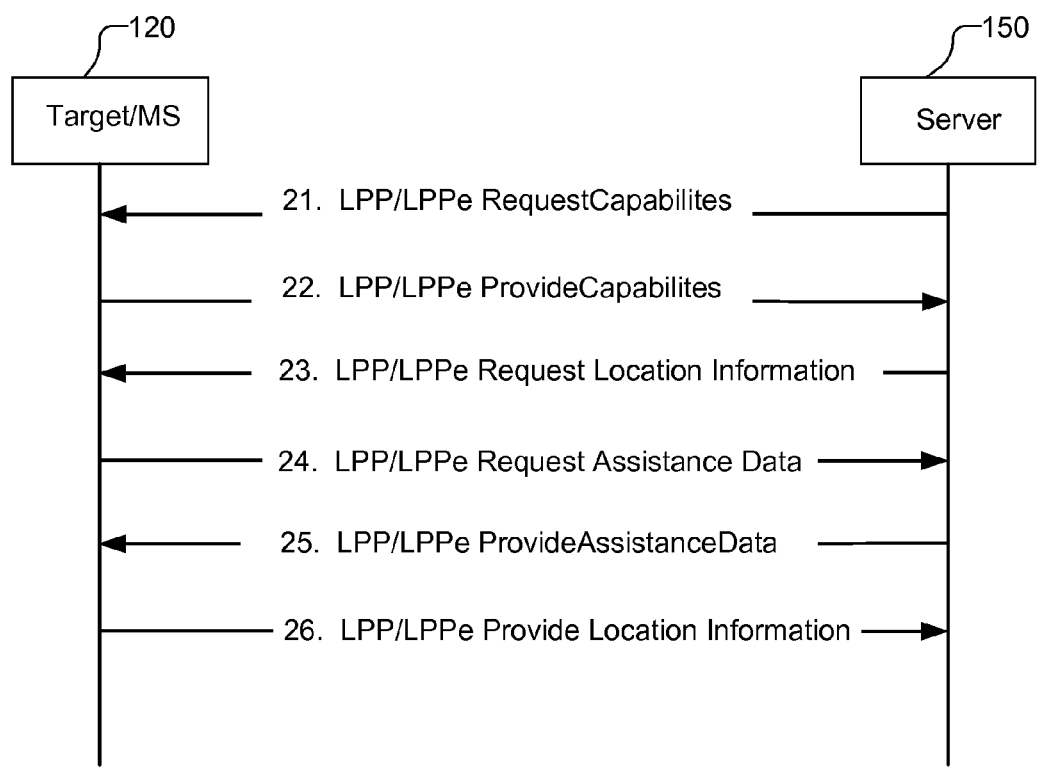
FIG. 2 illustrates the message flow of a basic procedure that supports transfer of assistance data from a server to a mobile station, and transfer of location information from a mobile station to a server.

FIG. 2 illustrates the message flow of a basic procedure that supports transfer of assistance data from the server 150 to the MS 120 and transfer of location information (e.g., RSTD measurement) from MS 120 to server 150 using a connection and, where applicable, a location session between the MS 120 and server 150 that remains established during the entire data transfer. For the sake of example, the message flow is described as LPP/LPPe positioning protocol messages, but it should be understood that other types of messages may be used if desired (e.g. LPP messages).

In step 21, if the LPP/LPPe capabilities including the multi-PRS sequence and antenna switching assistance data capabilities of the MS 120 are not known to server 150, then, in some embodiments, server 150 may send an LPP/LPPe Request Capabilities message to MS 120. The Request Capabilities message, which requests the LPP/LPPe capabilities of the MS 120, may include, among other parameters, a request for OTDOA capabilities, including capability indication for PAPs and/or support for multi-PRS sequences from the same cell/PCI.

The MS 120 may respond with a LPP/LPPe Provide Capabilities message sent to the server 150 in step 22 of the message flow. In certain aspects of the described embodiments, the Provide Capabilities message may be provided by MS 120 unsolicited in step 22 in the absence of a Request Capabilities message being sent in step 21. In another embodiment, the Provide Capabilities message in step 22 may be sent instead by MS 120 in association with a request for assistance data sent later in step 24. The Provide Capabilities message includes, among other parameters, an indication of MS OTDOA capabilities, including capability indication for PAPs and/or support for multi-PRS sequences from the same cell/PCI.

Steps similar to steps 21 and 22 but with message transfer in the opposite direction may be performed instead of step 21 and 22 or in addition to steps 21 and 22 to transfer the LPP/LPPe capabilities of server 150 to MS 120 regarding support for OTDOA capabilities, including capability indication for PAPs and/or support for multi-PRS sequences from the same cell/PCI. These steps are not shown in FIG. 2 and, if used, may make use of a reversed LPPe mode whereby a MS 120 is enabled to request and receive capabilities from a server 150.

In step 23 of the message flow, the server 150 requests location information from MS 120 in a LPP/LPPe Request Location Information message. The request for location information may include a request for RSTD measurements to be performed by MS 120.

In some embodiments, MS 120 may request OTDOA assistance data in order to fulfill the request received in step 23 and may send an LPP/LPPe request for assistance data to the server 150, in step 24. In some embodiments, MS 120 may specify the particular assistance data requested, such as OTDOA assistance data, including one or more of PRS assistance information, antenna switching assistance information, antenna switching pattern information, and/or muting information, and/or PAP assistance information. In some embodiments, step 24 may not occur and the server 150 may decide to send assistance data to MS 120 unsolicited.

In step 25 of the message flow, server 150 may obtain the assistance data to be transferred to MS 120. If step 24 was performed, the assistance data may comprise all of the assistance information requested by the MS 120 that may be available to server 150. The assistance data transferred in step 25 may include the OTDOA assistance data defined in LPP/LPPe and may also include antenna switching and PAP assistance information.

The MS 120 may then measure RSTDs between a reference cell and multiple neighbor cells based on the OTDOA assistance data received in step 25. In some embodiments, MS 120 may utilize antenna switching information included in the assistance data to determine the RSTDs as described above. For example, if antenna switching is used on a particular cell, the MS 120 may determine a set of TOA values for each cell, and select a final TOA from this set for RSTD calculation.

If the assistance data received in step 25 indicates a multi-PRS sequence, the MS 120 may then determine a replica PRS sequence for TOA estimation by using the seed of equation (3) accordingly. In some embodiments, $f(PAP_h)$ in equation (3) may be included in the assistance data received in step 25, together with other OTDOA assistance data such as PCI etc.

Once MS 120 has determined all measurements as requested by the server 150 in step 23, such as RSTD measurements for example, it may send the measurements in an LPP/LPPe Provide Location Information message to server 150 in step 26. The LPP/LPPe Provide Location Information message in step 26 may include the RSTD measurements together with an identification of the measured cells, such as the PCI and the $f(PAP_h)$ for which the RSTDs are provided. In some embodiments, server 150 may use the received measurements along with information of the antenna locations from which the MS has performed the measurements as well as BS timing information to calculate the location of MS 120. Server 150 may then provide the calculated location of MS 120 to LCS client 160, for example (not shown in FIG. 2).

In some embodiments, MS 120 may use the measurements together with information of the antenna locations from which the MS 120 has performed the measurements as well as BS timing information to calculate the location of MS 120 and possibly report the estimated location to server 150. In some embodiments, server 150 may provide the MS location information to LCS client 160.

Figure 3A:
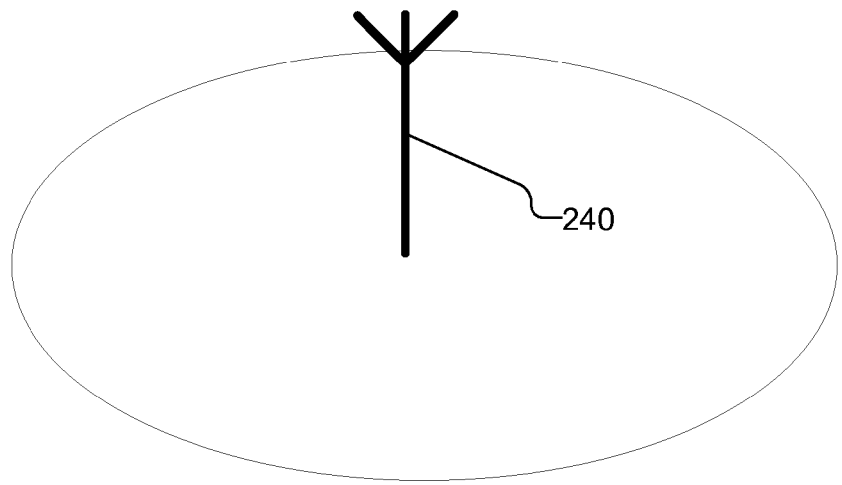
FIG. 3A shows a traditional single physical transmitting antenna element system with a single physical transmitting antenna element radiating at high power.
Figure 3B:
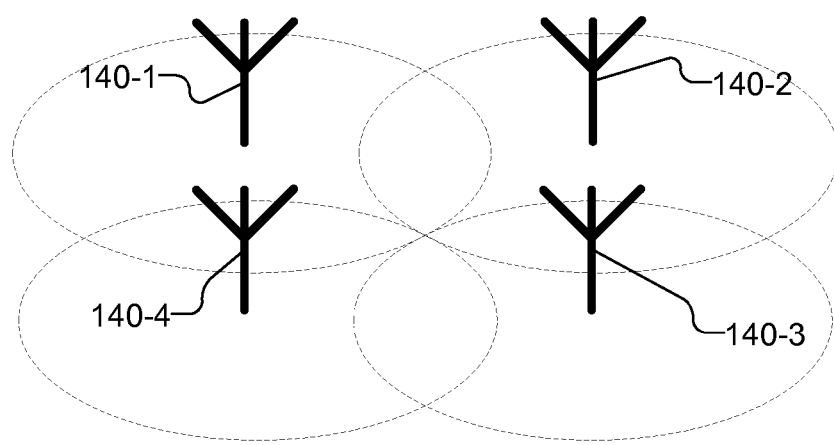
FIG. 3B illustrates exemplary multiple transmit antenna system with four physical transmitting antenna elements.

FIG. 3a shows a traditional single physical transmitting antenna element system 300 with conventional single physical transmitting antenna element 240 radiating at high power. Conventional single physical transmitting antenna element 240 may provide coverage for a single cell/PCI. Conventional techniques using PRS and OTDOA measurements may be utilized by MS 120 for location determination in traditional single physical transmitting antenna element system 300.

FIG. 3b illustrates DAS 350 with multiple physical transmitting antenna elements 140-1, 140-2, 140-3 and 140-4. In DAS 350, multiple physical transmitting antenna elements 140-1, 140-2, 140-3 and 140-4, which may be spatially separated and connected to a common source may replace conventional single physical transmitting antenna element 240 and provide coverage for the same cell. In distributed antenna system 350, the transmitted power is split among physical transmitting antenna elements 140, which may be separated in space so as to provide coverage over the same area as conventional single physical transmitting antenna element 240, but with reduced total power and improved reliability. Thus, DAS 350 may be realized by replacing traditional single physical transmitting antenna element system 300 with a group of low-power physical transmitting antenna elements 140-1, 140-2, 140-3 and 140-4 to cover the same area.

Typically, in conventional deployed single-cell DAS, the physical transmitting antenna elements 140 may be located in the same cell/PCI and physical transmitting antenna elements 140-1, 140-2, 140-3 and 140-4 may all transmit the same PRS signal thereby preventing accurate determination of the location of the signal transmitter and making MS position calculation impractical.

Figure 4:
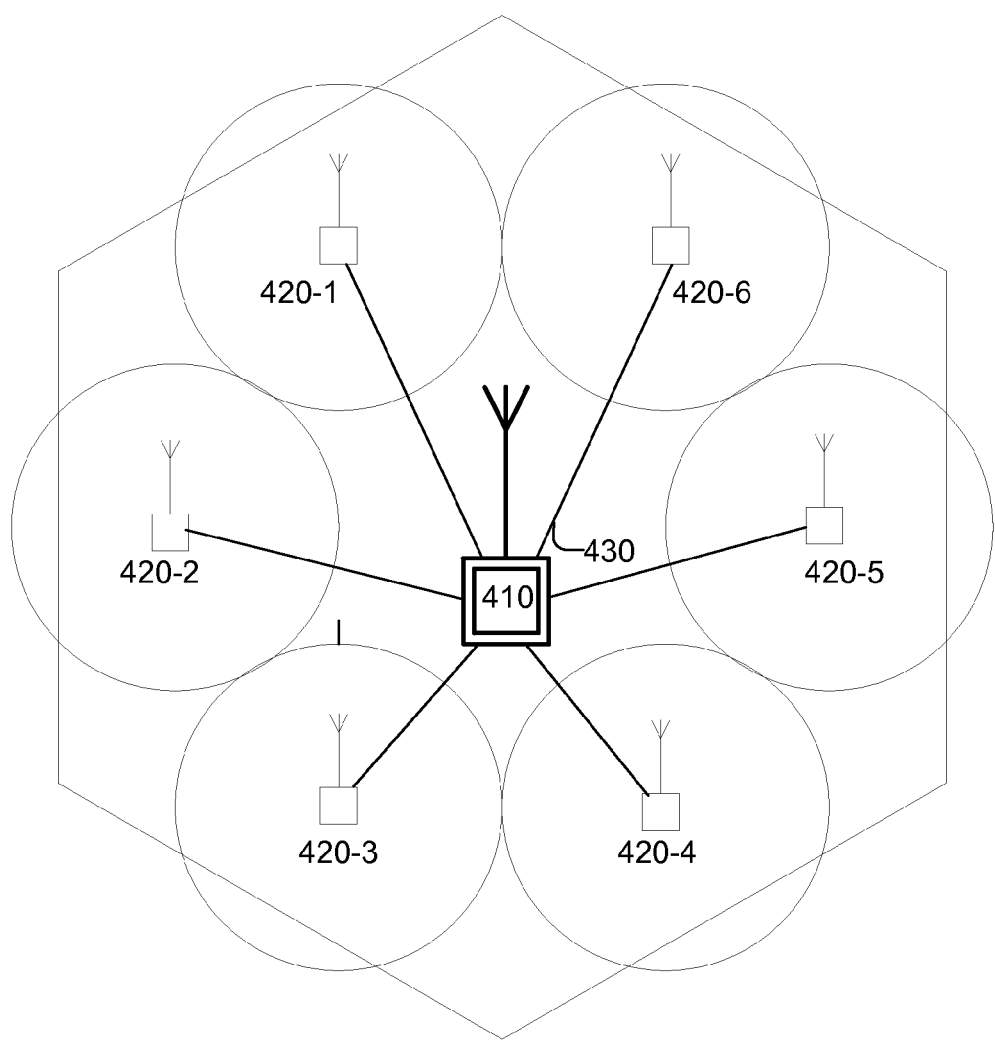
FIG. 4 illustrates an exemplary RRH system with multiple RRH transmitters serving a single cell.

FIG. 4 illustrates an RRH system 400 with multiple RRH transmitters 420-1, 420-2 . . . 420-6 serving a single cell. In RRH system 400, individual RRH transmitters 420-1-420-6 may be remote to eNodeB (BS) 410 and may be coupled to eNodeB 410 using optical connectors 430.

In conventionally deployed RRH systems, where the RRHs serve a single cell/PCI, each RRH may transmit the same PRS signal. For example, such a situation may arise, as described earlier, in LTE-Advanced Cooperative Multi Point (CoMP) transmission, where RRHs provide coverage within a macrocell coverage area. Thus, in the above conventional scenario, each RRH may transmit the same PRS signal thereby preventing accurate determination of the location of the signal transmitter and making MS position calculation impractical.

In some embodiments, to permit robust position determination of MS 120 in DAS 350 (FIG. 3B) or RRH system 400 (FIG. 4), logical antenna port 6, which is used for PRS transmissions, may be mapped to Physical Antenna Ports (PAPs), and a PRS sequence may be generated as a function of the PAP ID. Similarly, in situations where a cell is served by multiple RRHs, logical antenna port 6 on the RRHs may be mapped to PAPs, and a PRS sequence may be generated as a function of the PAP ID. Accordingly, as discussed earlier, the initialization seed $c_{init}$ may be modified as shown in equation (3) as $c_{init}=2^{10}(\cdot 7(\cdot n_s+1)+l+1)(\cdot 2 \cdot N_{ID}^{cell}+1)+2 \cdot N_{ID}^{cell}+N_{CP}+f(PAP_h)$. Because $c_{init}$ is a function of the PAP ID $PAP_h$, in some embodiments, a different PRS sequence may be transmitted from each of physical transmitting antenna elements 140-1, 140-2, 140-3 and 140-4 or each RRH despite sharing a common PCI.

Although, a different PRS sequence may be transmitted from each physical transmitting antenna element as described above, the PRS tones in a LTE system, for example, may be the same for each physical transmitting antenna element, because the PCI determines one of the 6 possible frequency arrangements as described above. For example, the cell-specific frequency shift may be given by $v_{shift}=N_{IC}^{cell}$ mod 6, and since each physical transmitting antenna element has the same PCI $N_{IC}^{cell}$, each physical transmitting antenna element would transmit the different PRS sequence but in the same frequency arrangement ($v_{shift}$). Therefore, while the PRS sequence can be used to distinguish one physical transmitting antenna element from another, in some embodiments, different muting patterns may be utilized for each antenna element belonging to the same PCI to avoid overlapping PRS occasions in the frequency domain from multiple antenna elements. Thus, muting patterns may be used to further facilitate distinguishing between PRS sequences transmitted from different physical transmitting antenna elements.

Figure 5A:
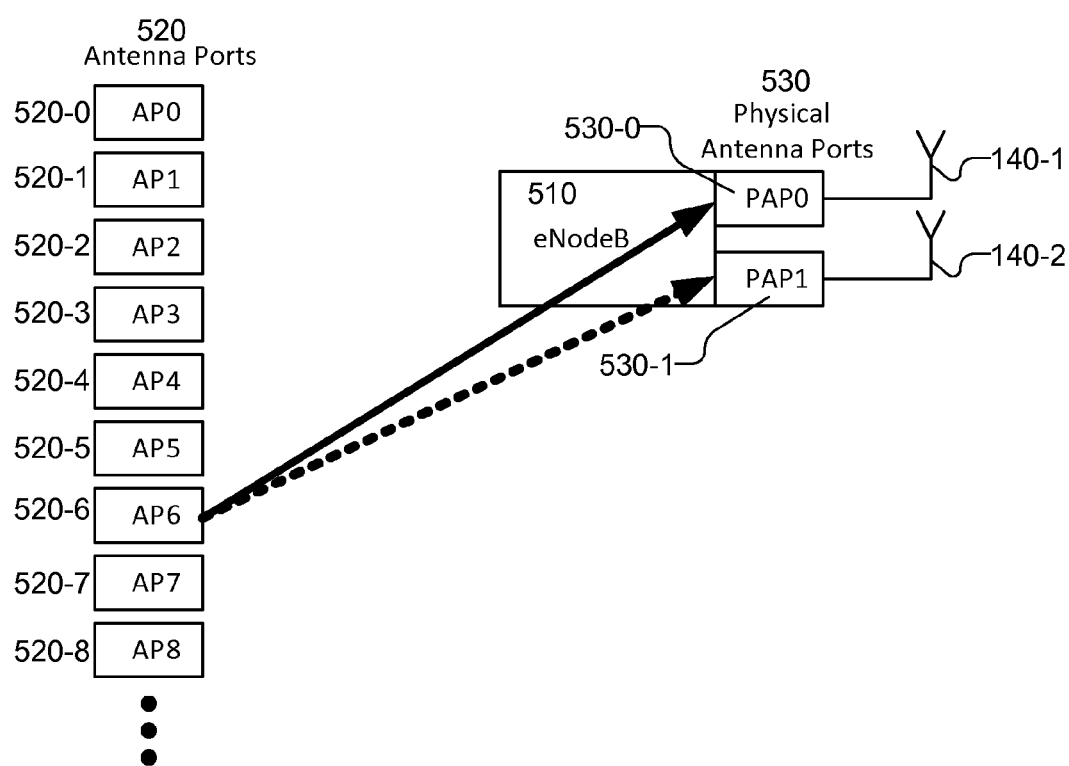
FIG. 5A shows an exemplary mapping of logical antenna port 6 used for PRS transmission in an antenna switching system to Physical Antenna Ports (PAP) with PAP ID 0 and 1.

FIG. 5A shows a mapping 500 of logical Antenna Port 6 520-6 used for PRS transmission in an antenna switching system to Physical Antenna Ports $PAP_0$ 530-0 with PAP ID 0 and $PAP_1$ 530-1 with PAP ID 1. FIG. 5A shows logical antenna ports 520, comprising logical antenna ports 520-1 through 520-8 and physical antenna ports 530. In FIG. 5A, logical antenna port 6 shares the same PCI as eNodeB 510. FIG. 5A assumes that there are two physical transmitting antenna elements 140-1 and 140-2 so that logical antenna port 6 may be mapped to two physical antenna ports 0 and 1 shown as PAP0 530-0 and PAP1 530-1, respectively. In FIG. 5A, $f(PAP_0)$ has been defined simply as $f(PAP_0)=0$ for $PAP_0$ with PAP ID 0, and $f(PAP_1)=1$, for $PAP_1$ with PAP ID 1. Thus, in FIG. 5A, each physical antenna port 530-0 and 530-1 would transmit a different PRS sequence, even though they share a common PCI. Note that $f(PAP_h)$, as described above, is exemplary and for descriptive purposes only. In general, $f(PAP_h)$ may be set to various mathematical functions of the PAP ID h, such as a linear function, a quadratic function, a polynomial, or any other mathematical function which uses the PAP ID as input value, and provides a defined output value $f(PAP_h)$.

In some embodiments, the PAP IDs may be provided by server 150 to MS 120 as part of the OTDOA assistance data using the appropriate LPP/LPPe protocols. In some embodiments, the OTDOA assistance data may include PAP IDs, or the function $f(PAP_h)$ to allow MS 120 to determine a replica PRS signal for each individual antenna port.

In some embodiments, by mapping logical antenna port 6 to Physical Antenna Ports (PAPs), and generating a PRS sequence as a function of the PAP ID, TX antennas (or RRHs) at different physical locations may be able to transmit distinct PRS signals despite sharing a common PCI.

Figure 5B:
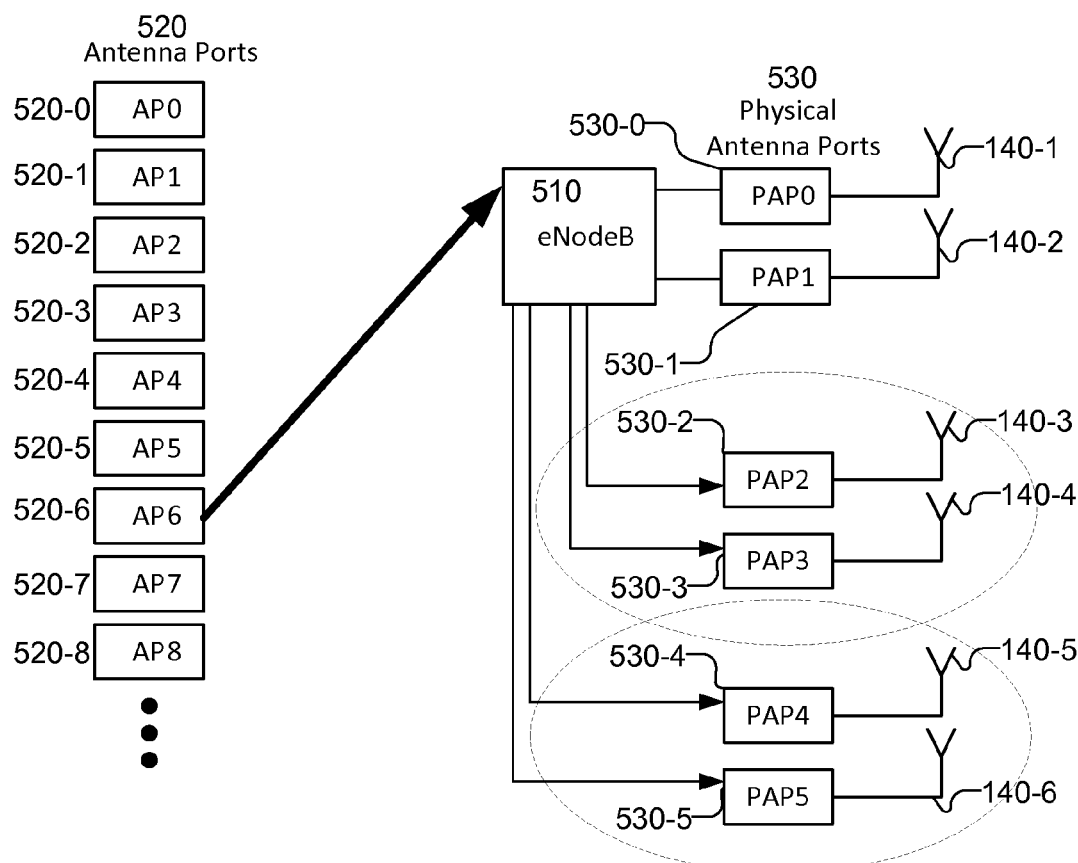
FIG. 5B shows an exemplary mapping of logical antenna Port 6 used for PRS transmission in a DAS or RRH system to Physical Antenna Ports PAP0 through PAP5 with PAP ID 0 through PAP ID 5, respectively.

FIG. 5B shows a mapping 550 of logical antenna port 6 520-6 used for PRS transmission in a DAS or RRH system to physical antenna ports $PAP_0$ 530-0 with PAP ID 0 through $PAP_5$ 530-5 with PAP ID 5. FIG. 5B shows logical antenna ports 520, comprising logical antenna ports 520-1 through 520-8 and physical antenna ports 530-0 through 530-5. In FIG. 5B, logical antenna port 6 shares the same PCI as eNodeB 510. FIG. 5B assumes that there are six physical transmitting antenna elements 140-1, 140-2 . . . 140-6 at different physical locations. As shown in FIG. 5B, logical antenna port 6 may be mapped to six physical antenna ports 0 through 5 shown as $PAP_0$ 530-0 through $PAP_5$ 530-5, respectively.

Figure 6A:
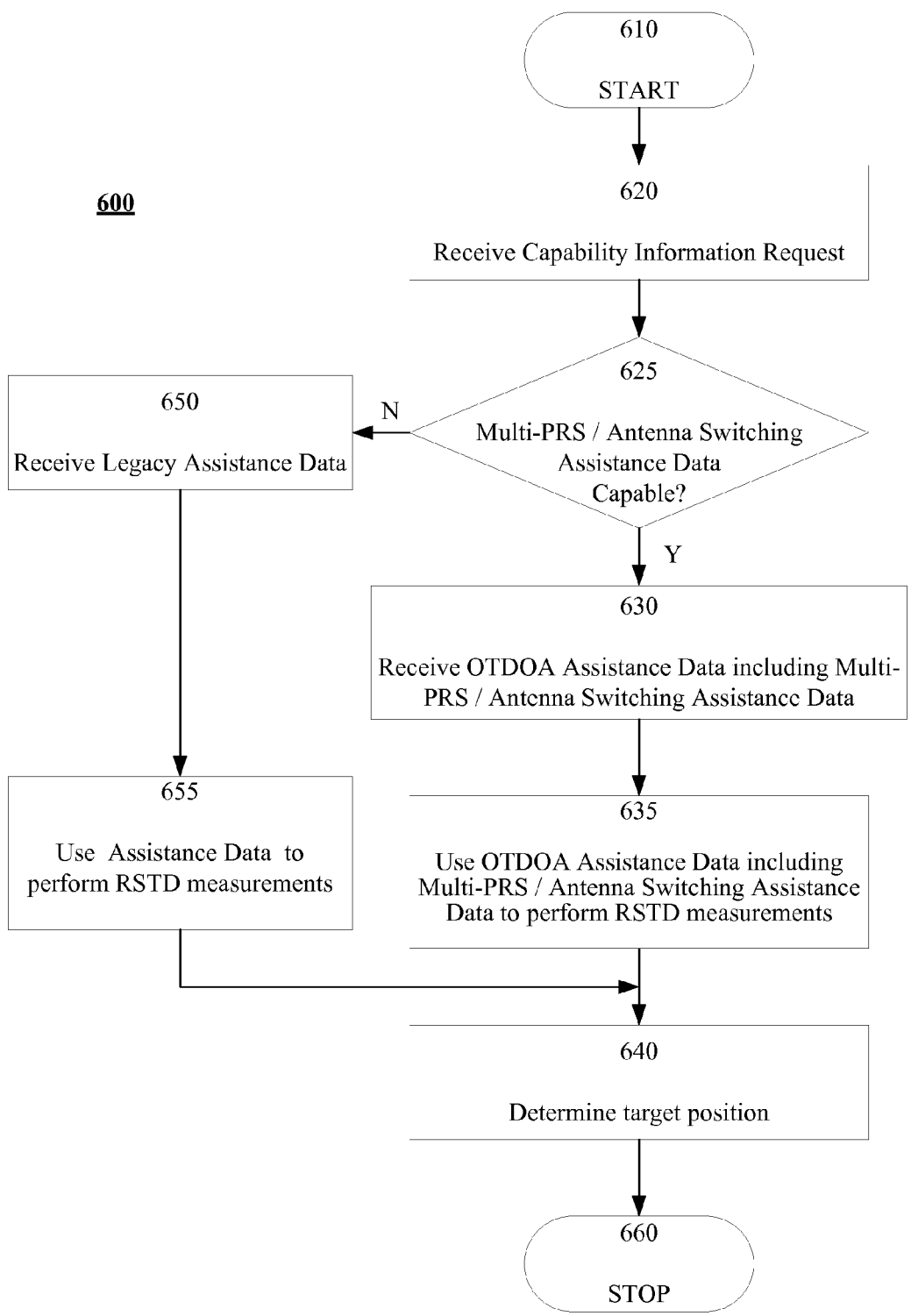
FIG. 6A shows a flowchart for an exemplary method to determine the position of a mobile station in a manner consistent with disclosed embodiments.

FIG. 6A shows a flowchart for an exemplary method 600 to determine the position of a MS 120 in a manner consistent with disclosed embodiments. In some embodiments, portions of method 600 may be performed by MS 120, and/or by some combination of MS 120, server 150, and/or another network entity. The method may start in step 610, for example, when MS 120 initiates location determination and/or when LCS client 160 or another network entity requests location information for MS 120. In some embodiments, portions of method 600 may be performed using an LPP or LLPe protocol.

Next, in step 620, a request for capability information may be received by the MS 120. For example, MS 120 may receive a Request Capabilities message, which may request the capabilities of the MS 120 such as, without limitation, OTDOA capabilities, including capability indication for PAPs and/or support for multi-PRS sequences from the same cell/PCI.

In step 625, MS 120 may determine, based in part, on stored capability information, whether MS 120 is capable of supporting/receiving OTDOA assistance information pertaining to PAPs, multi-PRS sequences from the same cell/PCI, and/or antenna switching assistance data. For example, the antenna switching assistance information may include PRS assistance information for one or more cells, which may comprise Boolean parameters corresponding to the one or more cells. Each Boolean parameter may indicate whether antenna switching occurs between PRS positioning occasions for a corresponding cell. In some embodiments, the antenna switching assistance information may also include information pertaining to an antenna switching interval. The antenna switching interval may be specified in terms of the number of consecutive PRS positioning occasions transmitted on a physical transmitting antenna element in the at least one cell before the physical transmitting antenna element is switched.

If MS 120 determines that it is capable of supporting OTDOA assistance information pertaining to PAPs, multi-PRS sequences from the same cell/PCI, and/or antenna switching assistance data ("Y" in step 630) then, in step 630, MS 120 may receive all of the assistance information requested by the MS 120, which may include the OTDOA assistance data defined in LPP and/or LPPe and may also include assistance information pertaining to multi-PRS sequences from the same cell/PCI, antenna switching assistance data, and/or PAP assistance information.

In step 635, MS 120 may measure RSTDs between a reference cell and multiple neighbor cells based on the OTDOA assistance data. In some embodiments, MS 120 may utilize the antenna switching information included in the assistance data to determine the RSTDs as described above. In one embodiment, if antenna switching is used on a particular cell, MS 120 may determine a set of TOA values for each cell, and select one TOA from this set for RSTD calculation. For example, if antenna switching is used by the at least one cell, then, MS 120 may select a Time of Arrival value for a PRS from a set of TOA values determined based on PRS related measurements at the MS during a single PRS positioning occasion. In some embodiments, the selected TOA value may be indicative of a shorter distance between a source of the PRS and the MS 120 than the other TOA values in the set.

If MS 120 determines that it is not capable of supporting OTDOA assistance information pertaining to PAPs, multi-PRS sequences from the same cell/PCI, and/or antenna switching assistance data etc. ("N" in step 630) then, in step 650, in some embodiments, MS 120 may receive legacy assistance information. For example, in some embodiments, MS 120 may receive information pertaining to a physical transmitting antenna element that maintains a PRS sequence unmodified by $f(PAP_h)$, which may be achieved by setting $f(PAP)=0$. For example, MS 120 may be provided with information pertaining to physical antenna port $PAP_0$, for which $f(PAP)=0$. Next, in step 655, MS 120 may measure RSTDs based on the legacy assistance information received in step 650.

In some embodiments, the position of MS 120 may then be determined in step 640 using the measured RSTD information. In some embodiments, MS 120 may compute its own location. In another embodiment, the position of MS 120 may be computed by server 150 based on the measured RSTD information. The method may terminate in step 660. Method 600 is exemplary and various modifications may be made by combining or omitting steps as would be apparent to one of ordinary skill in the art. For example, in some embodiments, such as where no legacy support is provided, steps 650 and 655 may be omitted and the method may proceed to step 660, where it terminates. As another example, the method may be modified depending on the protocol used for location assistance, the capabilities of MS 120, and/or capabilities of server 150.

Figure 6B:
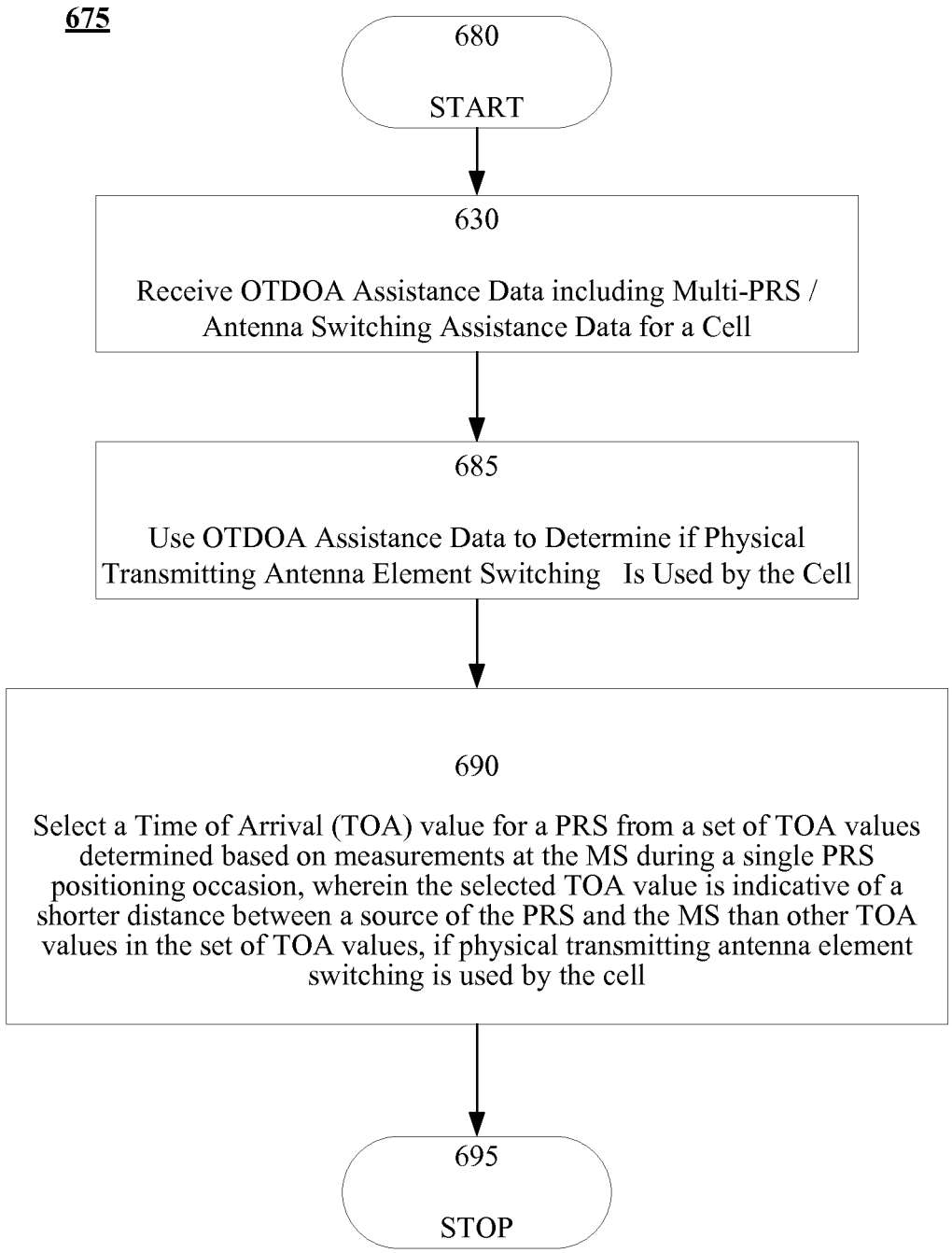
FIG. 6B shows a flowchart for an exemplary method to determine the position of a mobile station in a manner consistent with disclosed embodiments.

FIG. 6B shows a flowchart for another exemplary method 675 to determine the position of a MS 120 in a manner consistent with disclosed embodiments. In some embodiments, portions of method 600 may be performed by MS 120. The method may start in step 610, for example, when MS 120 initiates location determination and/or when LCS client 160 or another network entity requests location information for MS 120. In some embodiments, portions of method 675 may be performed using an LPP or LLPe protocol.

Next, in step 630, MS 120 may receive all of the assistance information requested by the MS 120, which may include the OTDOA assistance data defined in LPP and/or LPPe and may also include assistance information pertaining to multi-PRS sequences from the same cell/PCI, antenna switching assistance data, and/or PAP assistance information. For example, MS 120 may receive the OTDOA assistance information, which may comprise Positioning Reference Signal (PRS) assistance information including antenna switching assistance information for a cell.

In step 685, Ms 120 may determine whether physical transmitting antenna element switching is used by the cell based, at least in part, on the received antenna switching assistance information.

Next, in step 690, if physical transmitting antenna element switching is used by the cell, then, MS 120 may select a Time of Arrival (TOA) value for a PRS from a set of TOA values determined based on measurements at the MS during a single PRS positioning occasion, where the PRS is received by the MS and the selected TOA value is indicative of a shorter distance between a source of the PRS and the MS than other TOA values in the set of TOA values. In some embodiments, the selected TOA value may be used to determine an estimated location of MS 120. The method may terminate in step 660.

Figure 7A:
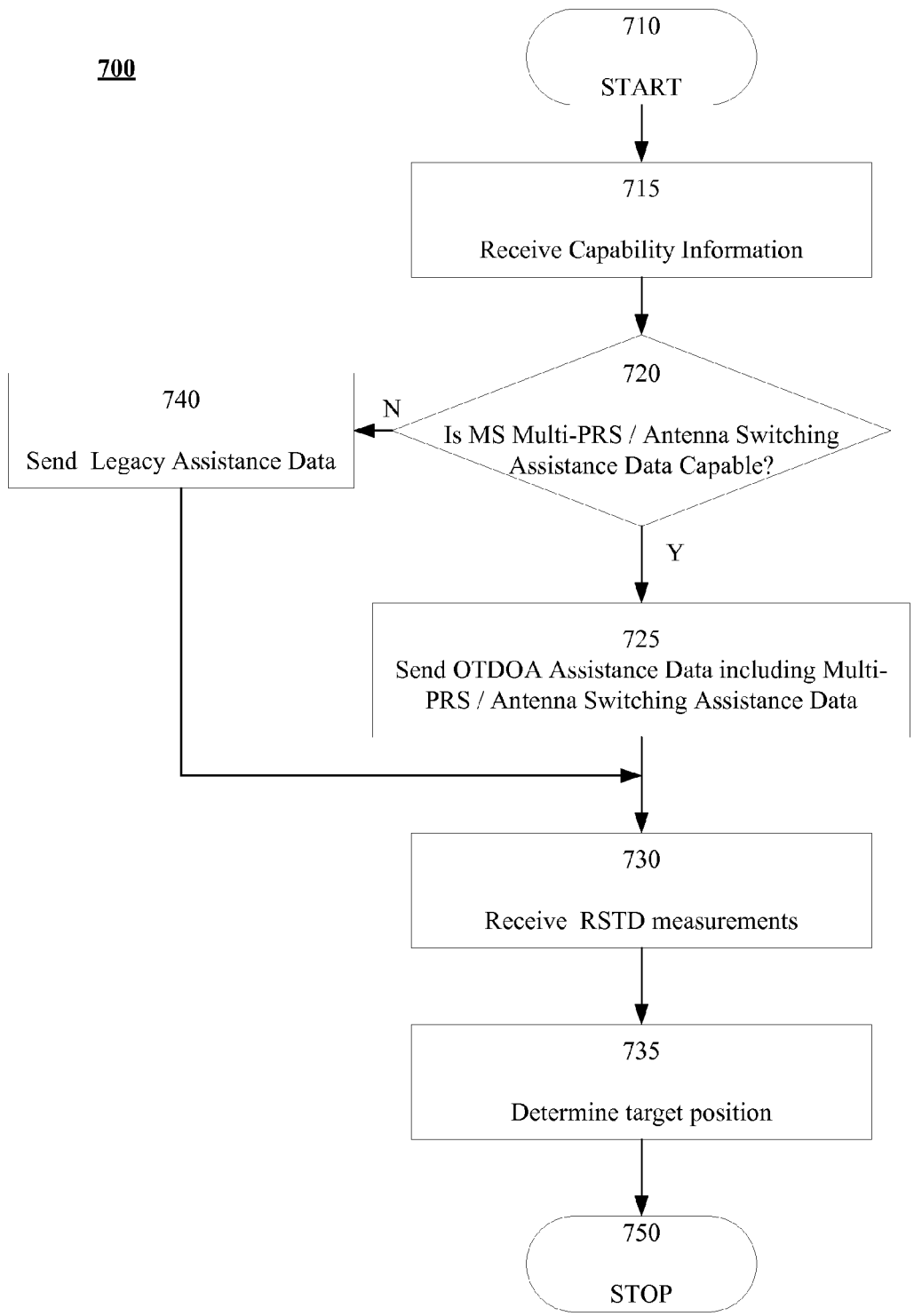
FIG. 7A shows a flowchart for an exemplary method to determine the position of a mobile station in a manner consistent with disclosed embodiments.

FIG. 7A shows a flowchart for an exemplary method 700 to determine the position of MS 120 in a manner consistent with disclosed embodiments. In some embodiments, portions of method 700 may be performed by a server 150. The method may start in step 710, for example, when server 150 or MS 120 initiates location determination and/or when LCS client 160 or another network entity requests location information for MS 120. In some embodiments, portions of method 700 may be performed using an LPP or LLPe protocol.

Next, in step 715, server 150 may receive capability information from MS 120. In some embodiments, the capability information may be received in a Provide Capabilities message, in response to an earlier Request Capabilities message sent by server 150. In some embodiments, the capability information received by server 150 may include, without limitation, information pertaining to mobile station's OTDOA capabilities, including an indication of support for PAPs, antenna switching assistance information, and/or support for multi-PRS sequences from the same cell/PCI.

In step 720, server 150 may determine, based in part, on the received capability information, whether MS 120 is capable of supporting/receiving OTDOA assistance information pertaining to PAPs, multi-PRS sequences from the same cell/PCI, and/or antenna switching assistance data.

If server 150 determines that MS 120 is capable of supporting OTDOA assistance information pertaining to PAPs, multi-PRS sequences from the same cell/PCI, and/or antenna switching assistance data ("Y" in step 720) then, in step 725, server 150 may send all of the assistance information requested by MS 120, which may include the OTDOA assistance data defined in LPP and/or LPPe and may also include assistance information pertaining to multi-PRS sequences from the same cell/PCI, antenna switching assistance data, and/or PAP assistance information. In some embodiments, server 150 may transmit the PAP ID as part of OTDOA assistance information. Further, the PAP ID may be transmitted as part of OTDOA assistance information based, in part, on received information indicating a capability to generate a replica PRS sequence at MS 120 in communication with server 150 (e.g. a location server). In some embodiments, the location assistance information may be transmitted in a Provide Assistance Data message to MS 120.

If server 150 determines that MS 120 does not support OTDOA assistance information pertaining to PAPs, multi-PRS sequences from the same cell/PCI, and/or antenna switching assistance data ("N" in step 720) then, in step 740, in some embodiments, server 150 may send legacy assistance information to MS 120. For example, in some embodiments, server 150 may send information pertaining to a physical transmitting antenna element that maintains a PRS sequence unmodified by $f(PAP_h)$, which may be achieved by setting $f(PAP)=0$. For example, server 150 may send information pertaining to physical antenna port $PAP_0$, for which $f(PAP)=0$.

Next, in step 730, server 150 may receive RSTDs measured by MS 120 based on the provided assistance information. In step 735, the location of MS 120 may be determined based on the measured RSTDs. For example, if antenna switching is used on a particular cell, server 150 may receive one TOA value from a set of measured TOA based on the OTDOA assistance information provided.

In some embodiments, the position of MS 120 may then be determined in step 735 using the measured RSTD information. In some embodiments, MS 120 may compute its own location and relay the location to server 150. In another embodiment, the position of MS 120 may be computed by server 150 based on the measured RSTD information. The method may then terminate in step 750.

Method 700 is exemplary and various modifications may be made by combining or omitting steps as would be apparent to one of ordinary skill in the art. For example, in some embodiments, such as where no legacy support is provided, step 740 may be omitted and the method may proceed to step 750, where it terminates. As another example, the method may be modified depending on the protocol used for location assistance, the capabilities of MS 120, and/or capabilities of the location assistance server.

Figure 7B:
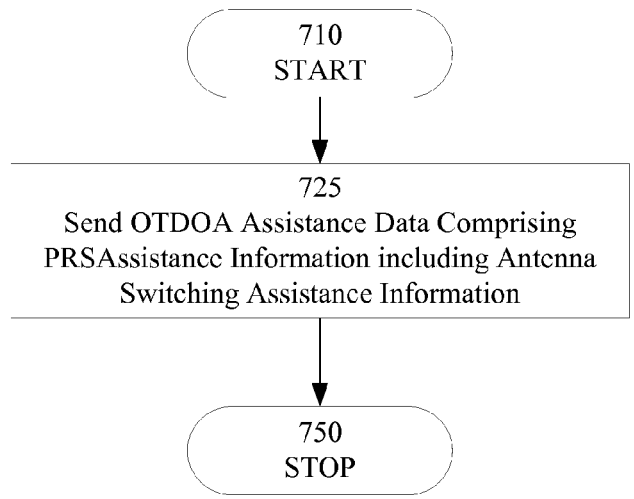
FIG. 7B shows a flowchart for an exemplary method that may be used during a location estimation procedure in a manner consistent with disclosed embodiments.

FIG. 7B shows a flowchart for an exemplary method 755 that may be used during location estimation in a manner consistent with disclosed embodiments. In some embodiments, portions of method 755 may be performed by a server 150. The method may start in step 710, for example, when server 150 or MS 120 initiates location determination and/or when LCS client 160 or another network entity requests location information for MS 120. In some embodiments, portions of method 755 may be performed using an LPP or LLPe protocol.

Next, in step 725, server 150 may send all of the assistance information requested by MS 120, which may include the OTDOA assistance data defined in LPP and/or LPPe and may also include assistance information pertaining to multi-PRS sequences from the same cell/PCI, antenna switching assistance data, and/or PAP assistance information. For example, server 150 may send OTDOA assistance information to MS 120, where the OTDOA assistance information may comprise Positioning Reference Signal (PRS) assistance information including antenna switching assistance information for at least one cell in a subset of cells served by the server 150. The method may then terminate in step 750.

Figure 7C:
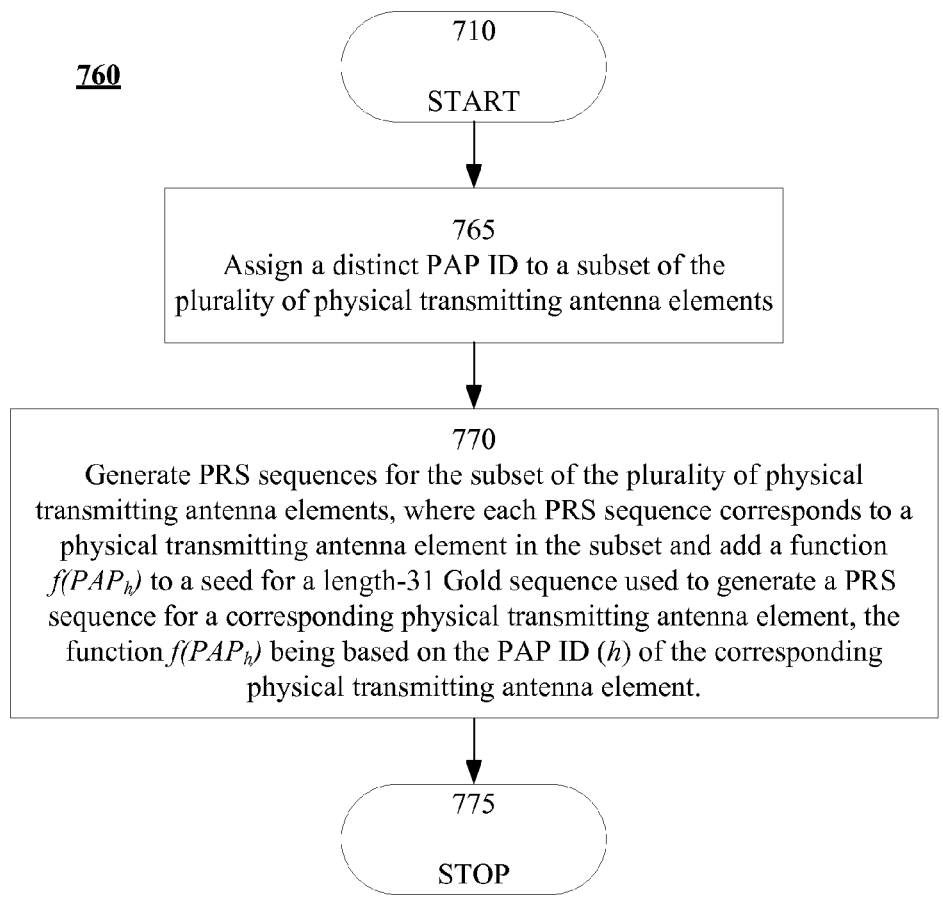
FIG. 7C shows an exemplary method of generating distinct PRS sequences in a system comprising a plurality of physical transmitting antenna elements.

FIG. 7C shows an exemplary method 760 of generating distinct PRS sequences in a system comprising a plurality of physical transmitting antenna elements. In some embodiments, portions of method 760 may be performed by a server 150. The method may start in step 710, for example, when server 150 or MS 120 initiates location determination and/or when LCS client 160 or another network entity requests location information for MS 120. In some embodiments, portions of method 760 may be performed using an LPP or LLPe protocol.

Next, in step 765, server 150 may assign a distinct PAP ID to a subset of the plurality of physical transmitting antenna elements. In step 770, the server may generate PRS sequences for the subset of the plurality of physical transmitting antenna elements, where each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on the PAP ID (h) of the corresponding physical transmitting antenna element. The method may terminate in step 775.

Figure 8:
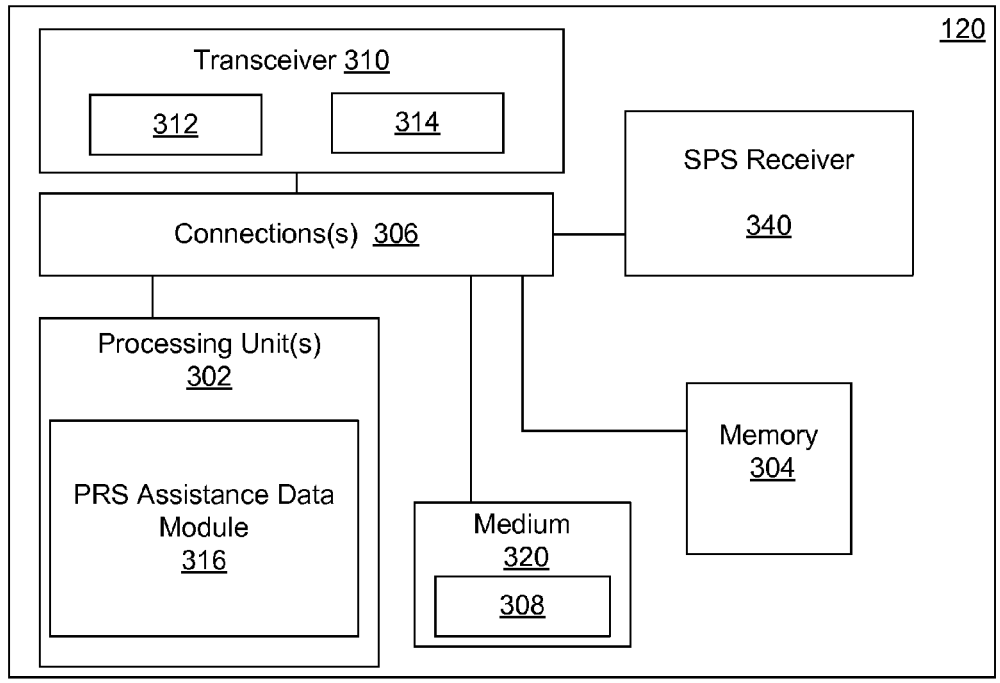
FIG. 8 is a schematic block diagram of a mobile station capable of receiving location assistance messages and supporting location determination in a manner consistent with disclosed embodiments.

FIG. 8 shows a schematic block diagram illustrating certain exemplary features of MS 120 enabled to support OTDOA measurement using PRS assistance information in systems with antenna diversity, DAS, and/or RRHs in a manner consistent with disclosed embodiments. MS 120 may, for example, include one or more processing units 302, memory 304, a transceiver 310 (e.g., wireless network interface), and (as applicable) an SPS receiver 340, which may be operatively coupled with one or more connections 306 (e.g., buses, lines, fibers, links, etc.) to non-transitory computer-readable medium 320 and memory 304. In certain example implementations, all or part of MS 120 may take the form of a chipset, and/or the like. The SPS receiver 340 may be enabled to receive signals associated with one or more SPS resources. Transceiver 310 may, for example, include a transmitter 312 enabled to transmit one or more signals over one or more types of wireless communication networks and a receiver 314 to receive one or more signals transmitted over the one or more types of wireless communication networks.

Processing unit 302 may be implemented using a combination of hardware, firmware, and software. In some embodiments, processing unit 302 may include MS PRS Assistance Data Module 316, which may process received OTDOA assistance information, including PRS assistance information. For example, MS PRS Assistance Data Module 316 may process PRS assistance information comprising antenna switching assistance information including antenna switching pattern information and antenna muting information. In some embodiments, MS PRS Assistance Data Module 316 may also process PAP IDs, and/or the function $f(PAP_h)$ received as part of OTDOA assistance information. Processing unit 302 may also be capable of processing various other received LPP/LPPe messages including assistance information either directly or in conjunction with one or more other functional blocks shown in FIG. 8. In some embodiments, processing unit 302 may represent one or more circuits configurable to perform at least a portion of a data signal computing procedure or process related to the operation of MS 120.

In some embodiments, MS 120 may include one or more MS antennas (not shown) which may be internal or external. MS antennas may be used to transmit and/or receive signals processed by transceiver 310 and/or SPS receiver 340. In some embodiments, MS antennas may be coupled to transceiver 310 and SPS receiver 340. In some embodiments, measurements of signals received (transmitted) by MS 120 may be performed at the point of connection of the MS antennas and transceiver 310. For example, the measurement point of reference for received (transmitted) RF signal measurements may be an input (output) terminal of the receiver 314 (transmitter 312) and an output (input) terminal of the MS antennas. In an MS 120 with multiple MS antennas or antenna arrays, the antenna connector may be viewed as a virtual point representing the aggregate output (input) of multiple MS antennas. In some embodiments, MS 120 may measure received signals including signal strength and TOA measurements and the raw measurements may be processed by processing units 302.

The methodologies described herein may be implemented by various means depending upon the application. For example, these methodologies may be implemented in hardware, firmware, software, or any combination thereof. For a hardware implementation, the processing unit 302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a non-transitory computer-readable medium 320 or memory 304 that is connected to and executed by processing unit 302. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 308 on a non-transitory computer-readable medium, such as medium 320 and/or memory 304. Examples include computer-readable media encoded with a data structure and computer-readable media encoded with a computer program 308. For example, the non-transitory computer-readable medium including program code 308 stored thereon may include program code 308 to support OTDOA measurement using PRS assistance information in systems with antenna diversity, DAS, and/or RRHs in a manner consistent with disclosed embodiments. Non-transitory computer-readable media 320 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code 308 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 320, instructions and/or data may be provided as signals on transmission media included in a communication apparatus. For example, a communication apparatus may include a transceiver 310 having signals indicative of instructions and data. The instructions and data are configured to cause one or more processors to implement the functions outlined in the claims. That is, the communication apparatus includes transmission media with signals indicative of information to perform disclosed functions.

Memory 304 may represent any data storage mechanism. Memory 304 may include, for example, a primary memory and/or a secondary memory. Primary memory may include, for example, a random access memory, read only memory, etc. While illustrated in this example as being separate from processing unit 302, it should be understood that all or part of a primary memory may be provided within or otherwise co-located/coupled with processing unit 302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 320. As such, in certain example implementations, the methods and/or apparatuses presented herein may take the form in whole or part of a computer-readable medium 320 that may include computer implementable instructions 308 stored thereon, which if executed by at least one processing unit 302 may be operatively enabled to perform all or portions of the example operations as described herein. Computer readable medium 320 may be a part of memory 304.

Figure 9:
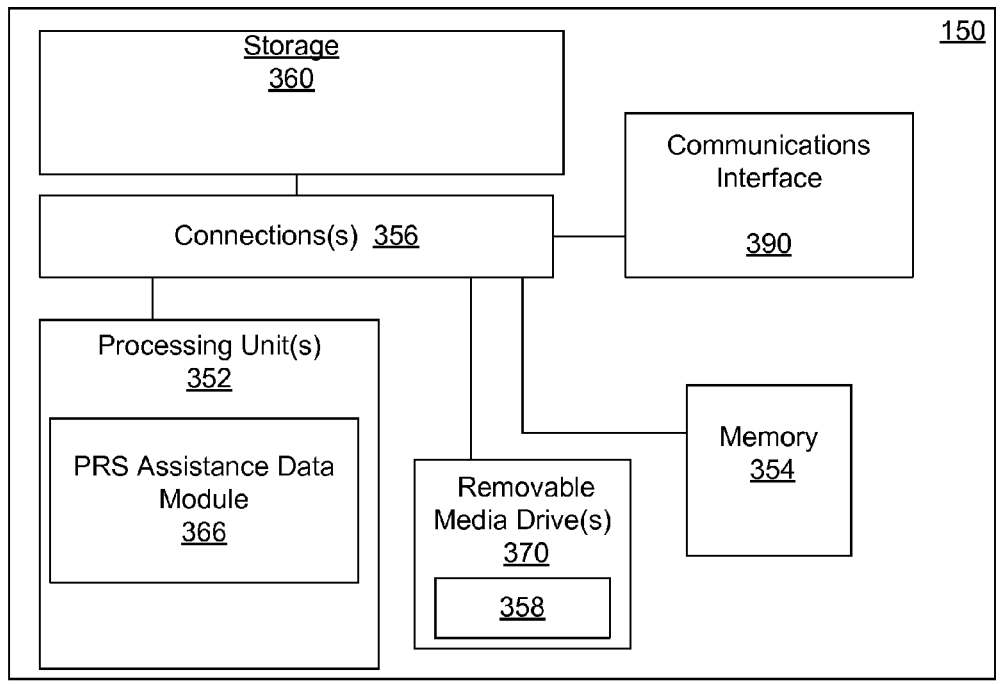
FIG. 9 is a schematic block diagram illustrating an apparatus such as an exemplary server enabled to support the location determination.

Reference is now made to FIG. 9, which is a schematic block diagram illustrating a server 150 enabled to support OTDOA measurement using PRS assistance information in systems with antenna diversity, DAS, and/or RRHs in a manner consistent with disclosed embodiments. In some embodiments, server 150 may include, for example, one or more processing units 352, memory 354, storage 360, and (as applicable) communications interface 390 (e.g., wireline or wireless network interface), which may be operatively coupled with one or more connections 356 (e.g., buses, lines, fibers, links, etc.). In certain example implementations, some portion of server 150 may take the form of a chipset, and/or the like.

Communications interface 390 may include a variety of wired and wireless connections that support wired transmission and/or reception and, if desired, may additionally or alternatively support transmission and reception of one or more signals over one or more types of wireless communication networks. Communications interface 390 may also include interfaces for communication with various other computers and peripherals. For example, in one embodiment, Communications interface 390 may comprise network interface cards, input-output cards, chips and/or ASICs that implement one or more of the communication functions performed by server 150. In some embodiments, communications interface 390 may also interface with network 130 to obtain a variety of network configuration related information, such as PCIs, configured PRS information, and/or timing information used by the base stations in the network. For example, Communications interface 390 may make use of the LPP annex (LPPa) protocol defined in 3GPP TS 36.455 or a modification of this protocol to obtain PCI, configured PRS, timing and/or other information from the base stations in network 130. Processing unit 352 may use some or all of the received information to generate OTDOA assistance data information in a manner consistent with disclosed embodiments.

Processing unit 352 may be implemented using a combination of hardware, firmware, and software. In some embodiments, processing unit 352 may include Server PRS Assistance Data Module 366, which may generate OTDOA information, including PRS assistance information for transmission to mobile stations 120. For example, Server PRS Assistance Data Module 366 may generate and/or format PRS assistance information comprising antenna switching assistance information and antenna switching pattern information. In some embodiments, Server PRS Assistance Data Module 366 may also generate PAP IDs, or the function $f(PAP_h)$ as part of OTDOA assistance information for transmission to mobile stations 120. Processing unit 352 may also be capable of processing various other LPP/LPPe assistance information either directly or in conjunction with one or more other functional blocks shown in FIG. 9. In some embodiments, processing unit 352 may generate the OTDOA assistance information as Long Term Evolution (LTE) Positioning Protocol (LPP) or LPP extensions (LPPe) messages. In some embodiments, processing unit 352 may represent one or more circuits configurable to perform at least a portion of a data signal computing procedure or process related to the operation of server 150.

The methodologies described herein in flow charts and message flows may be implemented by various means depending upon the application. For example, these methodologies may be implemented in hardware, firmware, software, or any combination thereof. For a hardware implementation, the processing unit 352 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in removable media drive 370, which may support the use of non-transitory computer-readable media 358, including removable media. Program code may be resident on non-transitory computer readable media 358 or memory 354 and may be read and executed by processing units 352. Memory may be implemented within processing units 352 or external to the Processing units 352. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 358 and/or memory 354. Examples include computer-readable media encoded with a data structure and computer-readable media encoded with a computer program. For example, non-transitory computer-readable medium 358 including program code stored thereon may include program code to support OTDOA measurement using PRS assistance information in systems with antenna diversity, DAS, and/or RRHs in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 390, which may store the instructions/data in memory 354, storage 360 and/or relayed the instructions/data to processing units 352 for execution. For example, communications interface 390 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 354 may represent any data storage mechanism. Memory 354 may include, for example, a primary memory and/or a secondary memory. Primary memory may include, for example, a random access memory, read only memory, nonvolatile RAM, etc. While illustrated in this example as being separate from processing unit 352, it should be understood that all or part of a primary memory may be provided within or otherwise co-located/coupled with processing unit 352. Secondary memory may include, for example, the same or similar type of memory as primary memory and/or storage 360 such as one or more data storage devices 360 including, for example, hard disk drives, optical disc drives, tape drives, a solid state memory drive, etc. In some embodiments, storage 360 may comprise one or more databases that may hold information pertaining to various entities in system 100 and/or the broader cellular network. In some embodiments, information in the databases may be read, used and/or updated by processing units 352 during various computations, including storing capabilities of MS 120, capabilities of server 150, generating OTDOA assistance data, computing a location of MS 120, etc.

In certain implementations, secondary memory may be operatively receptive of, or otherwise configurable to couple to a non-transitory computer-readable medium 358. As such, in certain example implementations, the methods and/or apparatuses presented herein may take the form in whole or part of a removable media drive 370 that may include non-transitory computer readable medium 358 with computer implementable instructions stored thereon, which if executed by at least one processing unit 352 may be operatively enabled to perform all or portions of the example operations as described herein. Computer readable medium 358 may be a part of memory 354.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A processor-implemented method of providing Observed Time Difference of Arrival (OTDOA) assistance information from a location server, the method comprising:
    sending, via a communications interface on the location server, the OTDOA assistance information to a User Equipment (UE), the OTDOA assistance information comprising Positioning Reference Signal (PRS) assistance information, wherein when physical transmitting antenna element switching is used by at least one cell in a subset of cells served by the location server, the PRS assistance information includes antenna switching assistance information for the at least one cell, wherein the antenna switching assistance information further comprises at least one of:
        one or more parameters, and wherein each of the one or more parameters:
            identifies a cell in the subset of cells served by the location server, and
            indicates whether physical transmitting antenna element switching occurs between PRS positioning occasions for the cell; or,
        information pertaining to an antenna switching interval.

2. The method of claim 1, wherein the one or more parameters comprise Boolean parameters.

3. The method of claim 1, wherein:
    the antenna switching interval is specified in terms of a number of consecutive PRS positioning occasions transmitted on a physical transmitting antenna element in the at least one cell before the physical transmitting antenna element is switched.

4. The method of claim 3, wherein the antenna switching assistance information further comprises at least one of:
    antenna switching pattern information.

5. The method of claim 1, wherein the OTDOA assistance information is sent to the MS using Long Term Evolution (LTE) Positioning Protocol (LPP) or LPP extensions (LPPe) messages.

6. The method of claim 1, wherein the location server for the at least one cell is one of: a Serving Mobile Location Center (SMLC), or an Evolved SMLC (E-SMLC), of a Position Determination Entity (PDE), or a Secure User Plane Location (SUPL) Location Platform (SLP).

7. A location server comprising:
    a communications interface, the communications interface to send Observed Time Difference of Arrival (OTDOA) assistance information to User Equipment (UE); and
    a processor coupled to the communications interface, the processor configured to generate the OTDOA assistance information for at least one cell in a subset of cells served by the location server, the OTDOA assistance information comprising Positioning Reference Signal (PRS) assistance information, wherein when physical transmitting antenna element switching is used by the at least one cell, the PRS assistance information includes antenna switching assistance information for the at least one cell, wherein the antenna switching assistance information further comprises at least one of:
one or more parameters, and wherein each of the one or more parameters:
identifies a cell in the subset of cells served by the location server, and
indicates whether physical transmitting antenna element switching occurs between PRS positioning occasions for the cell; or,
information pertaining to an antenna switching interval.

8. The location server of claim 7, wherein the one or more parameters comprise Boolean parameters.

9. The location server of claim 7, wherein:
the antenna switching interval is specified in terms of a number of consecutive PRS positioning occasions transmitted on a physical transmitting antenna element in the at least one cell before the physical transmitting antenna element is switched.

10. The location server of claim 9, wherein the antenna switching assistance information further comprises at least one of:
antenna switching pattern information.

11. The location server of claim 7, wherein:
the processor further generates the OTDOA assistance information as Long Term Evolution (LTE) Positioning Protocol (LPP) or LPP extensions (LPPe) messages.

12. A location server comprising:
means for sending Observed Time Difference of Arrival (OTDOA) assistance information to a User Equipment (UE); and
means for generating the OTDOA assistance information for at least one cell in a subset of cells served by the location server, the OTDOA assistance information comprising Positioning Reference Signal (PRS) assistance information, wherein when physical transmitting antenna element switching is used by the at least one cell, the PRS assistance information includes antenna switching assistance information for the at least one cell, wherein the antenna switching assistance information further comprises at least one of:
one or more parameters, and wherein each of the one or more parameters:
identifies a cell in the subset of cells served by the location server, and
indicates whether physical transmitting antenna element switching occurs between PRS positioning occasions for the cell; or,
information pertaining to an antenna switching interval.

13. The location server of claim 12, wherein the one or more parameters comprise Boolean parameters.

14. The location server of claim 12, wherein:
the antenna switching interval is specified in terms of a number of consecutive PRS positioning occasions transmitted on a physical transmitting antenna element in the at least one cell before the physical transmitting antenna element is switched.

15. The location server of claim 14, wherein the antenna switching assistance information further comprises at least one of:
antenna switching pattern information.

16. The location server of claim 12, wherein:
means for generating generates the OTDOA assistance information as Long Term Evolution (LTE) Positioning Protocol (LPP) or LPP extensions (LPPe) messages.

17. A non-transitory computer-readable medium comprising executable instructions for providing Observed Time Difference of Arrival (OTDOA) assistance information from a location server, wherein the executable instructions configure a processor to:
send, via a communications interface on the location server, the OTDOA assistance information to a User Equipment (UE), the OTDOA assistance information comprising Positioning Reference Signal (PRS) assistance information, wherein when physical transmitting antenna element switching is used by at least one cell in a subset of cells served by the location server, the PRS assistance information includes antenna switching assistance information for the at least one cell, wherein the antenna switching assistance information further comprises at least one of:
one or more parameters, and wherein each of the one or more parameters:
identifies a cell in the subset of cells served by the location server, and
indicates whether physical transmitting antenna element switching occurs between PRS positioning occasions for the cell; or,
information pertaining to an antenna switching interval.

18. The computer-readable medium of claim 17, wherein the one or more parameters comprise Boolean parameters.

19. The computer-readable medium of claim 17, wherein:
the antenna switching interval is specified in terms of a number of consecutive PRS positioning occasions transmitted on a physical transmitting antenna element in the at least one cell before the physical transmitting antenna element is switched.

20. The computer-readable medium of claim 19, wherein the antenna switching assistance information further comprises at least one of:
antenna switching pattern information.

21. The computer-readable medium of claim 17, wherein the antenna switching assistance information is provided using Long Term Evolution (LTE) Positioning Protocol (LPP) or LPP extensions (LPPe) messages.

22. A method comprising:
receiving Observed Time Difference of Arrival (OTDOA) assistance information at a mobile station (MS), wherein the OTDOA assistance information comprises Positioning Reference Signal (PRS) assistance information including antenna switching assistance information for at least one cell;
determining whether physical transmitting antenna element switching is used by the at least one cell based, at least in part, on the received antenna switching assistance information; and
if physical transmitting antenna element switching is used by the at least one cell, then, selecting a Time of Arrival (TOA) value for a PRS from a set of TOA values determined based on measurements at the MS during a single PRS positioning occasion, wherein the PRS is received by the MS and the selected TOA value is indicative of a shorter distance between a source of the PRS and the MS than other TOA values in the set of TOA values.

23. The method of claim 22, wherein the antenna switching assistance information is provided using Long Term Evolution (LTE) Positioning Protocol (LPP) or LPP extensions (LPPe) messages.

24. The method of claim 22, wherein the OTDOA assistance information is transmitted by a location server for the at least one cell.

25. The method of claim 22 further comprising determining a location of the MS based, in part, on the selected TOA value and the OTDOA assistance information.

26. A mobile station (MS) comprising:
a transceiver capable of receiving a Positioning Reference Signal (PRS) and Observed Time Difference of Arrival (OTDOA) assistance information, wherein the OTDOA assistance information comprises PRS assistance information including antenna switching assistance information for at least one cell; and
a processor coupled to the transceiver, the processor configured to:
determine whether physical transmitting antenna element switching is used by the at least one cell based, at least in part, on the received antenna switching assistance information, and
select a Time of Arrival (TOA) value for a PRS from a set of TOA values determined based on measurements during a single PRS positioning occasion, wherein the PRS is received by the MS and the selected TOA value is indicative of a shorter distance between a source of the PRS and the MS than other TOA values in the set of TOA values, if physical transmitting antenna element switching is used by the at least one cell.

27. The mobile station of claim 26, wherein the antenna switching assistance information is provided using Long Term Evolution (LTE) Positioning Protocol (LPP) or LPP extensions (LPPe) messages.

28. The mobile station of claim 26, wherein the processor is further configured to determine a location of the MS based, in part, on the selected TOA value and the OTDOA assistance information.

29. A mobile station comprising:
transceiver means, the transceiver means to receive a Positioning Reference Signal (PRS) and Observed Time Difference of Arrival (OTDOA) assistance information, wherein the OTDOA assistance information comprises PRS assistance information including antenna switching assistance information for at least one cell; and
processing means coupled to the transceiver means, the processing means further comprising:
means for determining whether physical transmitting antenna element switching is used by the at least one cell based, at least in part, on the received antenna switching assistance information, and
means for selecting a Time of Arrival (TOA) value for a PRS from a set of TOA values determined based on measurements during a single PRS positioning occasion, wherein the PRS is received by the mobile station (MS) and the selected TOA value is indicative of a shorter distance between a source of the PRS and the MS than other TOA values in the set of TOA values, if physical transmitting antenna element switching is used by the at least one cell.

30. The mobile station of claim 29, wherein the antenna switching assistance information is provided using Long Term Evolution (LTE) Positioning Protocol (LPP) or LPP extensions (LPPe) messages.

31. The mobile station of claim 29, wherein the processing means further comprise means for determining a location of the MS based, in part, on the selected TOA value and the OTDOA assistance information.

32. A non-transitory computer-readable medium comprising instructions, which when executed by a processor, perform steps in a method, the steps comprising:
receiving Observed Time Difference of Arrival (OTDOA) assistance information at a mobile station (MS), wherein the OTDOA assistance information comprises Positioning Reference Signal (PRS) assistance information including antenna switching assistance information for at least one cell;
determining whether physical transmitting antenna element switching is used by the at least one cell based, at least in part, on the received antenna switching assistance information; and
if physical transmitting antenna element switching is used by the at least one cell, then, selecting a Time of Arrival (TOA) value for a PRS from a set of TOA values determined based on measurements at the MS during a single PRS positioning occasion, wherein the PRS is received by the MS and the selected TOA value is indicative of a shorter distance between a source of the PRS and the MS than other TOA values in the set of TOA values.

33. The computer-readable medium of claim 32, wherein the antenna switching assistance information is provided using Long Term Evolution (LTE) Positioning Protocol (LPP) or LPP extensions (LPPe) messages.

34. The computer-readable medium of claim 32, wherein the OTDOA assistance information is transmitted by a location server for the at least one cell.

35. The computer-readable medium of claim 32 further comprising determining a location of the MS based, in part, on the selected TOA value and the OTDOA assistance information.

36. A method of generating a Positioning Reference Signal (PRS) sequence for a system comprising a plurality of physical transmitting antenna elements serving a single cell, the method comprising:
assigning a distinct Physical Antenna Port (PAP) identifier (ID) to a subset of the plurality of physical transmitting antenna elements; and
generating PRS sequences for the subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on the PAP ID (h) of the corresponding physical transmitting antenna element.

37. The method of claim 36, wherein the plurality of physical transmitting antenna elements comprise a Distributed Antenna System (DAS).

38. The method of claim 36, wherein the plurality of physical transmitting antenna elements are realized using Remote Radio Heads (RRHs).

39. The method of claim 36, wherein the PAP ID (h) is transmitted as part of Observed Time Difference of Arrival (OTDOA) assistance information for the corresponding physical transmitting antenna element by a location server.

40. The method of claim 39, wherein the PAP ID (h) is transmitted as part of the Observed Time Difference of Arrival (OTDOA) assistance information for the corresponding physical transmitting antenna element based, at least in part, on received information indicating a capability to generate a replica PRS sequence at a mobile station.

41. The method of claim 36, wherein $f(PAP_h)=0$ for at least one of the plurality of physical transmitting antenna elements in the subset of the plurality of physical transmitting antenna elements.

42. An apparatus comprising:
a communications interface, the communications interface to send Observed Time Difference of Arrival (OTDOA) assistance information to a mobile station (MS), wherein OTDOA assistance information comprises Physical Antenna Port (PAP) identifiers (IDs); and
a processor coupled to the communications interface, the processor configured to:
assign a distinct PAP ID to each of a plurality of physical transmitting antenna elements serving a single cell, and
generate PRS sequences for a subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on a PAP ID (h) of the corresponding physical transmitting antenna element.

43. The apparatus of claim 42, wherein the plurality of physical transmitting antenna elements comprise a Distributed Antenna System (DAS).

44. The apparatus of claim 42, wherein the plurality of physical transmitting antenna elements are realized using Remote Radio Heads (RRHs).

45. The apparatus of claim 42, wherein the apparatus is a location server.

46. The apparatus of claim 45, wherein the processor is further configured to include the PAP ID (h) as part of the Observed Time Difference of Arrival (OTDOA) assistance information for the corresponding physical transmitting antenna element based, at least in part, on received information indicating a capability to generate a replica PRS sequence at the MS.

47. The apparatus of claim 42, wherein $f(PAP_h)=0$ for at least one of the physical transmitting antenna elements in the subset of the plurality of physical transmitting antenna elements.

48. An apparatus comprising:
communications means, the communications means configured to send Observed Time Difference of Arrival (OTDOA) assistance information to a mobile station (MS), wherein OTDOA assistance information comprises Physical Antenna Port (PAP) identifiers (IDs); and
processing means coupled to the communications means, the processing means further comprising:
means for assigning a distinct PAP ID to each of a plurality of physical transmitting antenna elements serving a single cell, and
means for generating PRS sequences for a subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on a PAP ID (h) of the corresponding physical transmitting antenna element.

49. The apparatus of claim 48, wherein the plurality of physical transmitting antenna elements comprise a Distributed Antenna System (DAS).

50. The apparatus of claim 48, wherein the plurality of physical transmitting antenna elements are realized using Remote Radio Heads (RRHs).

51. The apparatus of claim 48, wherein the apparatus is a location server.

52. The apparatus of claim 51, wherein the processing means further includes the PAP ID (h) as part of the Observed Time Difference of Arrival (OTDOA) assistance information for the corresponding physical transmitting antenna element based, at least in part, on received information indicating a capability to generate a replica PRS sequence at the MS.

53. The apparatus of claim 48, wherein $f(PAP_h)=0$ for at least one of the physical transmitting antenna elements in the subset of the plurality of physical transmitting antenna elements.

54. A non-transitory computer-readable medium comprising instructions, which, when executed by a processor, perform steps in a method of generating a Positioning Reference Signal (PRS) sequence for a system comprising a plurality of physical transmitting antenna elements serving a single cell, the steps comprising:
assigning a distinct Physical Antenna Port (PAP) identifier (ID) to a subset of the plurality of physical transmitting antenna elements; and
generating PRS sequences for the subset of the plurality of physical transmitting antenna elements, wherein each PRS sequence corresponds to a physical transmitting antenna element in the subset of the plurality of physical transmitting antenna elements, and a function $f(PAP_h)$ is added to a seed for a length-31 Gold sequence used to generate a PRS sequence for a corresponding physical transmitting antenna element, the function $f(PAP_h)$ being based on a PAP ID (h) of the corresponding physical transmitting antenna element.

55. The computer-readable medium of claim 54, wherein the plurality of physical transmitting antenna elements comprise a Distributed Antenna System (DAS).

56. The computer-readable medium of claim 54, wherein the plurality of physical transmitting antenna elements are realized using Remote Radio Heads (RRHs).

57. The computer-readable medium of claim 54, wherein the PAP ID (h) is transmitted as part of Observed Time Difference of Arrival (OTDOA) assistance information for the corresponding physical transmitting antenna element by a location server.

58. The computer-readable medium of claim 57, wherein the PAP ID (h) is transmitted as part of the Observed Time Difference of Arrival (OTDOA) assistance information for the corresponding physical transmitting antenna element based, at least in part, on received information indicating a capability to generate a replica PRS sequence at a mobile station.

59. The computer-readable medium of claim 54, wherein $f(PAP_h)=0$ for at least one of the physical transmitting antenna elements in the subset of the plurality of physical transmitting antenna elements.

60. A method on a mobile station comprising:
receiving a plurality of Positioning Reference Signal (PRS) sequences from a cell, wherein each PRS sequence in the plurality of received PRS sequences is based, in part, on a corresponding function $f(PAP_h)$, wherein the corresponding function $f(PAP_h)$ is:
added to a seed for a length-31 Gold sequence for a corresponding PRS sequence, and
based on a PAP ID (h) of a corresponding physical transmitting antenna element in the cell.

61. The method of claim 60, further comprising:
receiving, at the mobile station, Observed Time Difference of Arrival (OTDOA) assistance information comprising the PAP ID (h) for the corresponding physical transmitting antenna element.

62. The method of claim 61, further comprising:
generating, based on the PAP ID (h) for the corresponding physical transmitting antenna element, a corresponding replica PRS sequence.

63. A mobile station comprising:
a transceiver configured to:
receive a plurality of Positioning Reference Signal (PRS) sequences from a cell, wherein each PRS sequence in the plurality of received PRS sequences is based, in part, on a corresponding function $f(PAP_h)$, wherein the corresponding function $f(PAP_h)$ is:
added to a seed for a length-31 Gold sequence for a corresponding PRS sequence, and
based on a PAP ID (h) of a corresponding physical transmitting antenna element in the cell; and
a processor coupled to the transceiver, wherein the processor is configured to:
initiate transmission, by the transceiver, of capability information, indicating a capability to generate replica PRS sequences replicating the plurality of PRS sequences.

64. The mobile station of claim 63, wherein the transceiver is further configured to:
receive, in response to the capability information, Observed Time Difference of Arrival (OTDOA) assistance information comprising the PAP ID (h) for the corresponding physical transmitting antenna element.

65. The mobile station of claim 64, wherein the processor is further configured to:
generate, based on the PAP ID (h) for the corresponding physical transmitting antenna element a corresponding replica PRS sequence.

66. An apparatus comprising:
means for receiving a plurality of Positioning Reference Signal (PRS) sequences from a cell, wherein each PRS sequence in the plurality of received PRS sequences is based, in part, on a corresponding function $f(PAP_h)$, wherein the corresponding function $f(PAP_h)$ is:
added to a seed for a length-31 Gold sequence for a corresponding PRS sequence, and
based on a PAP ID (h) of a corresponding physical transmitting antenna element in the cell; and
processing means, the processing means to initiate transmission of capability information indicating a capability to generate PRS sequences replicating one or more of the received PRS sequences.

67. The apparatus of claim 66, further comprising:
means for receiving, in response to the capability information, Observed Time Difference of Arrival (OTDOA) assistance information comprising the PAP ID (h) for the corresponding physical transmitting antenna element.

68. A non-transitory computer-readable medium containing executable program instructions which cause a processor to:
receiving a plurality of Positioning Reference Signal (PRS) sequences from a cell, wherein each PRS sequence in the plurality of received PRS sequences is based, in part, on a corresponding function $f(PAP_h)$, wherein the corresponding function $f(PAP_h)$ is:
added to a seed for a length-31 Gold sequence for a corresponding PRS sequence, and
based on a PAP ID (h) of a corresponding physical transmitting antenna element in the cell.

69. The computer-readable medium of claim 68, wherein the executable program instructions further cause the processor to:
receive, at the mobile station, Observed Time Difference of Arrival (OTDOA) assistance information comprising the PAP ID (h) for the corresponding physical transmitting antenna element.

* * * * *